United States Patent
Murakami

(10) Patent No.: US 7,920,336 B2
(45) Date of Patent: Apr. 5, 2011

(54) BARRIER MECHANISM AND CAMERA

(75) Inventor: Taro Murakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 12/184,979

(22) Filed: Aug. 1, 2008

(65) Prior Publication Data

US 2009/0034075 A1    Feb. 5, 2009

(30) Foreign Application Priority Data

Aug. 3, 2007 (JP) ................. 2007-203033
Aug. 9, 2007 (JP) ................. 2007-208077
Aug. 10, 2007 (JP) ................. 2007-209691

(51) Int. Cl.
*G02B 15/14* (2006.01)
*G03B 17/00* (2006.01)
*H04N 5/225* (2006.01)

(52) U.S. Cl. .................. 359/704; 396/529; 348/376
(58) Field of Classification Search .................. 359/704, 359/808–809, 811, 818–819, 822; 396/529, 396/532, 535, 542; 348/208.99, 294, 335, 348/340, 373–374, 376
See application file for complete search history.

(56) References Cited

U.S. PATENT DOCUMENTS

| 5,774,748 A * | 6/1998 | Ito et al. ................. 396/80 |
| 6,988,837 B2 | 1/2006 | Ichino |
| 7,150,571 B2 | 12/2006 | Ichino |
| 2004/0165880 A1 | 8/2004 | Ichino |
| 2006/0024049 A1 | 2/2006 | Ichino |

FOREIGN PATENT DOCUMENTS

| JP | 2004-258120 | 9/2004 |
| JP | 2005-258276 | 9/2005 |

* cited by examiner

*Primary Examiner* — Ricky L Mack
*Assistant Examiner* — Dawayne A Pinkney
(74) *Attorney, Agent, or Firm* — Canon U.S.A., Inc., IP Division

(57) ABSTRACT

A barrel includes a through-hole through which an interlocking lever passes, the interlocking lever provided on a barrier drive member to receive a rotational force. The barrier drive member includes a flange portion in a circumferential direction. The flange portion is positioned at the same phase as the interlocking lever and covers the through-hole from an optical axis direction during a rotation of the barrier blades from an open state to a closed state.

3 Claims, 22 Drawing Sheets

BARRIER MECHANISM AND CAMERA

BACKGROUND OF THE INVENTION

1. Field of the Invention

The present invention relates to a barrier mechanism incorporated into a lens barrel of, for example, a digital camera, a silver-halide camera, or a video camera.

2. Description of the Related Art

In a high-magnification zoom lens barrel with a barrier mechanism, a first lens unit has a convex lens through which the interior of a second lens unit is magnified and thus dust coming into the zoom lens barrel is magnified. Therefore, a view will be deteriorated even with dust that is not visible, resulting in a demand for a more strict dust entrance prevention function.

Such a conventional barrier mechanism is known that includes barrier blades which rotate to open/close in front of a lens and a barrier drive member for driving the barrier blades (Japanese Patent Application Laid-Open No. 2004-258120).

The barrier mechanism controls the movement of the barrier drive member in an optical axis direction by using a partition which divides the barrier blades and the barrier drive member in the optical axis direction. Then, as a barrel moves in the optical axis direction, a rotational member such as a cam ring or the like, or a fixed cam allows the barrier drive member to rotate, thereby allowing the barrier blades to rotate (open/close) over the partition.

Recently, in order to reduce the number of apparatus parts, the barrier drive member is directly incorporated into the barrel using a bayonet structure to control the movement thereof in the optical axis direction, thereby allowing the barrier blades to rotate over the barrier drive member.

FIGS. 19 through 21 illustrate a conventional first lens unit barrel having the bayonet structure.

FIG. 19 is a view of the first lens unit barrel from an imaging surface side before a barrier drive member is incorporated into the first lens unit barrel. FIG. 20 is a view of the first lens unit barrel from the imaging surface side after the barrier drive member is incorporated into the first lens unit barrel and FIG. 21 is a view of the first lens unit barrel with the barrier drive member from an object side.

As shown in FIGS. 19 through 21, the first lens unit barrel 101 includes bayonet claws 101*d* into which flange portions 113*d* of a barrier drive member 113 fit, and a plurality of bayonet claws 101*i* and 101*j* which fit into a barrier cover (not shown) in a circumferential direction. An imaging surface side of the bayonet claws 101*d*, 101*i*, and 101*j* is provided with a hole 101*l*.

The imaging surface side of the first lens unit barrel 101 is provided with shaft holes 101*h* which serve as rotational fulcrums of the barrier blades (not shown) and a through-hole 101*f* to rotationally move an interlocking lever 113*f* of the barrier drive member 113 within the first lens unit barrel 101 in association with a cam ring or the like.

A technique is discussed in Japanese Patent Application Laid-Open No. 2005-258276 that discharges moisture coming into the barrel due to an air flow while the barrel is retracted, through holes formed in a barrier of the barrel and closes the holes with a water repellant sheet.

In the above described technique, the barrier blades are positioned at an object side of the first lens unit barrel 101, and the cam ring and the fixed cam which rotate the barrier drive member 113 are positioned at an imaging side of the first lens unit barrel 101. Therefore, the barrier drive member 113 is required to convey a driving force through the first lens unit barrel 101, and therefore, as described above, the first lens unit barrel 101 needs the through-hole 101*f* for the interlocking lever 113*f*.

In this case, if the barrier drive member 113 is to be attached to the first lens unit barrel 101 through the bayonet structure, it is required to provide the through-hole 101*f* in a wide angled range including an attachment phase of the bayonet claws 101*d*, 101*i*, and 101*j*. The through-hole 101*f* cannot be sealed with the water repellant sheet or the like in its entirety in the barrel as discussed in the Japanese Patent Application Laid-Open No. 2005-258276, and partial sealing of the through-hole 101*f* may cause a problem in rotating the barrier drive member 113.

In a molded barrel, if it is molded so that an undercut is omitted, a hole which allows a portion of a die to project from a parting line surface in the form of a convex shape is made. This is because the convex shaped portion can come into the opposite mold die. As a result, dust such as sand or dirt can easily enter the barrel through the hole or the through-hole 101*f*.

Once the dust such as the sand or the dirt enters the barrel through openings of the barrier mechanism, the dust causes malfunction. Further, if the dust enters the barrel, the sand or the dirt becomes visible through the first lens unit. In particular, in the case where the first lens unit is a convex lens, deterioration of the view occurs since the dust such as the sand or the dirt is magnified.

SUMMARY OF THE INVENTION

The present invention is directed to a barrier mechanism capable of preventing dust from coming into a barrel through a through-hole of an interlocking lever, and a camera with the barrier mechanism.

According to an aspect of the present invention, a barrier mechanism includes a barrel for holding a lens, barrier blades for protecting the lens held by the barrel, and a barrier drive member which rotates to open/close the barrier blades, wherein the barrel includes a through-hole through which an interlocking lever provided on the barrier drive member passes in order to convey a rotation force of the barrier drive member, wherein the barrier drive member includes a flange portion in a circumferential direction; and wherein the flange portion is positioned at the same phase as the interlocking lever and covers the through-hole from an optical axis direction during a rotation of the barrier blades from an open state to a closed state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Embodiment

Figure 1:
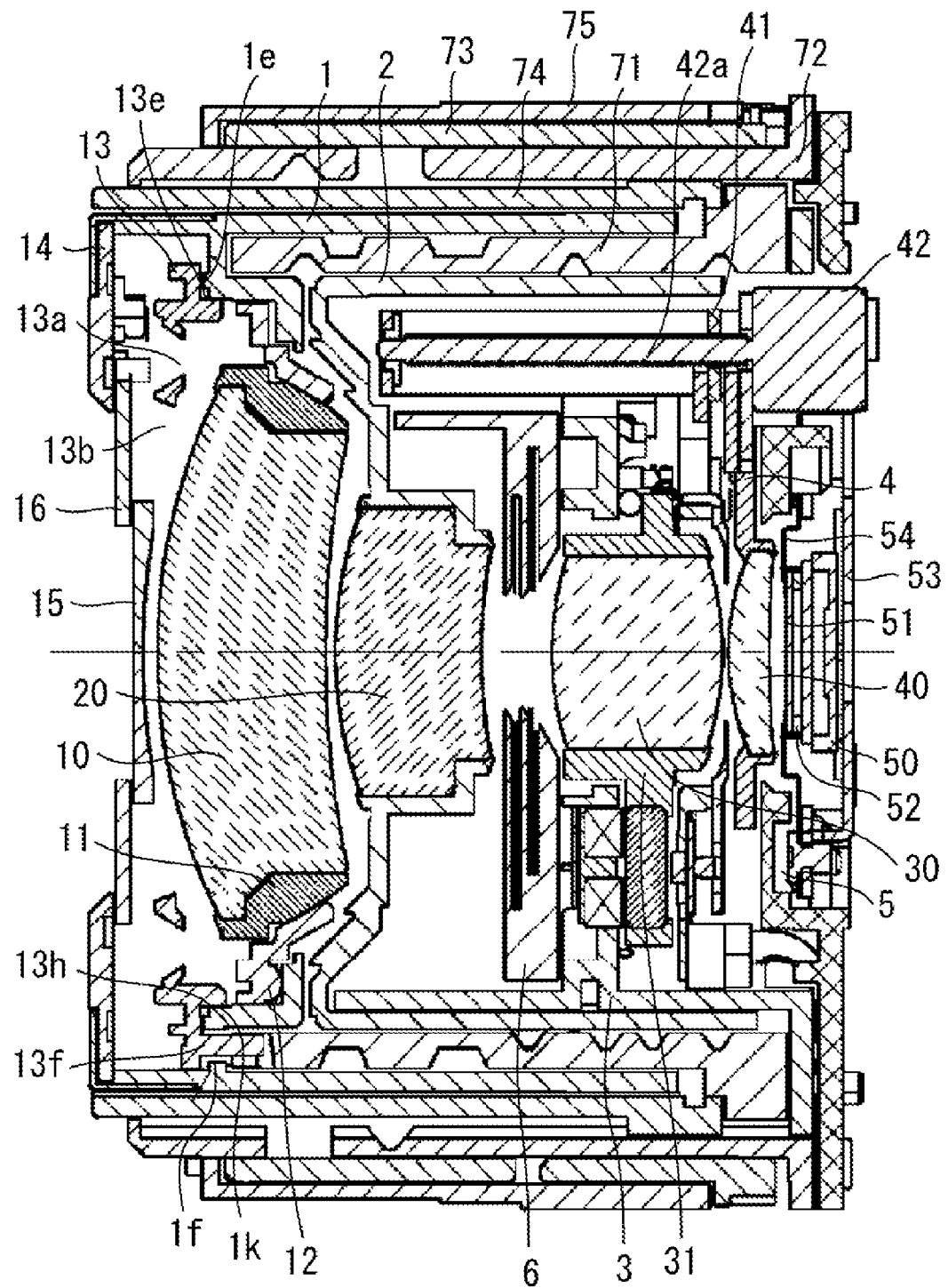
FIG. 1 is a cross sectional view illustrating a lens barrel (in a retracted state) with a barrier mechanism according to a first embodiment of the present invention.
Figure 2:
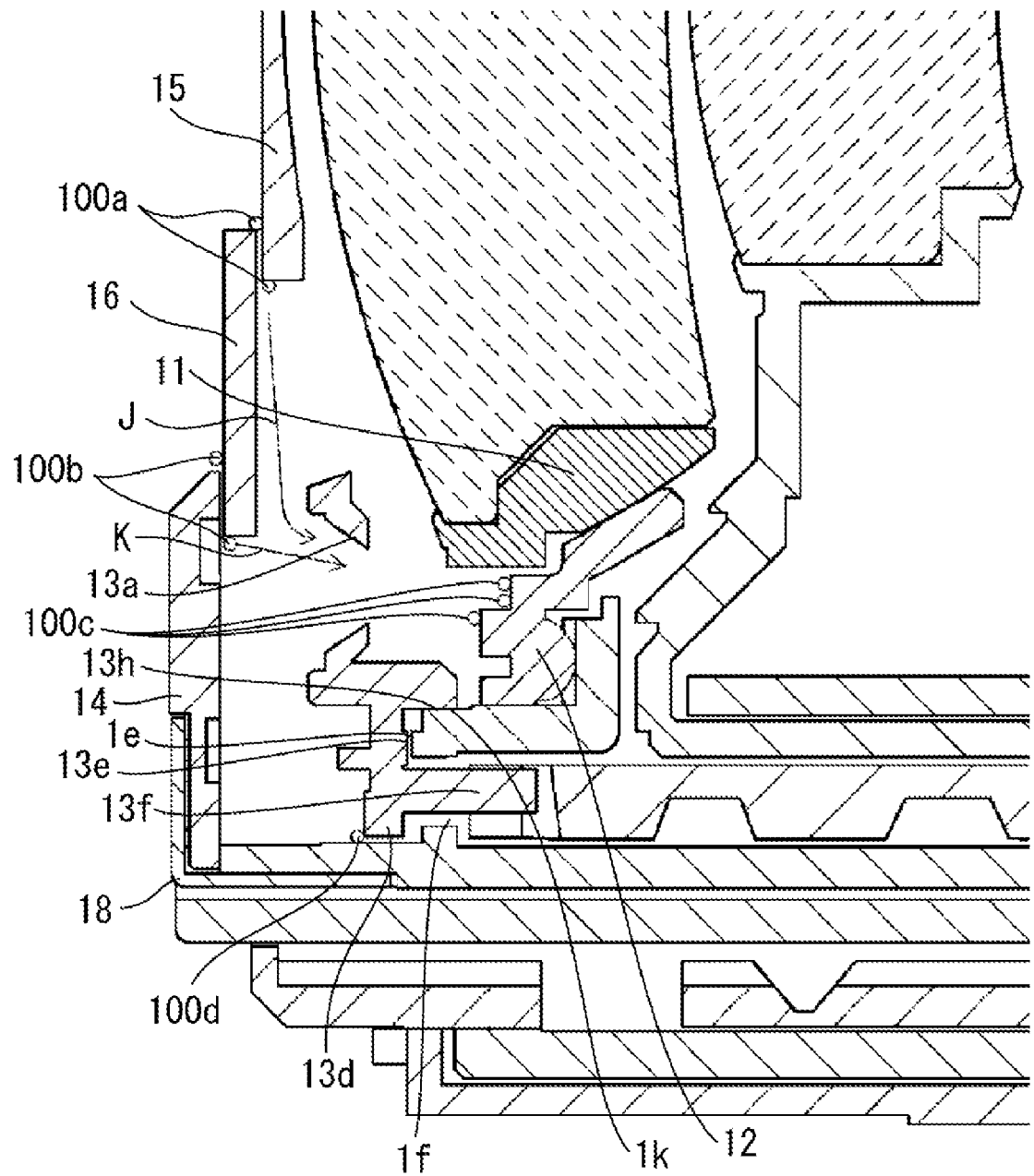
FIG. 2 is a partially enlarged view of the lens barrel of FIG. 1.
Figure 3:
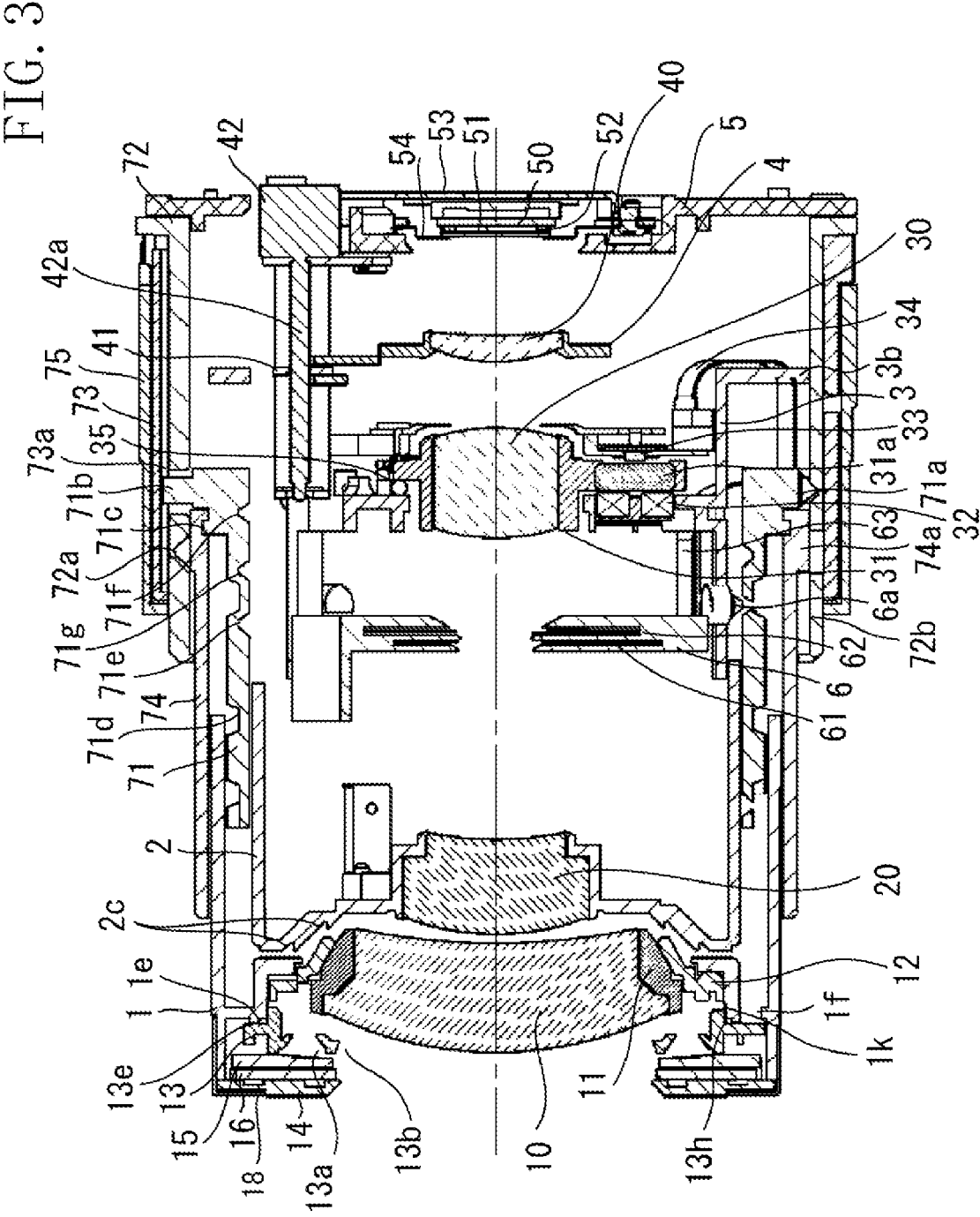
FIG. 3 is a cross sectional view of a wide-angle end of the lens barrel of FIG. 1 in a photo-taking state.
Figure 4:
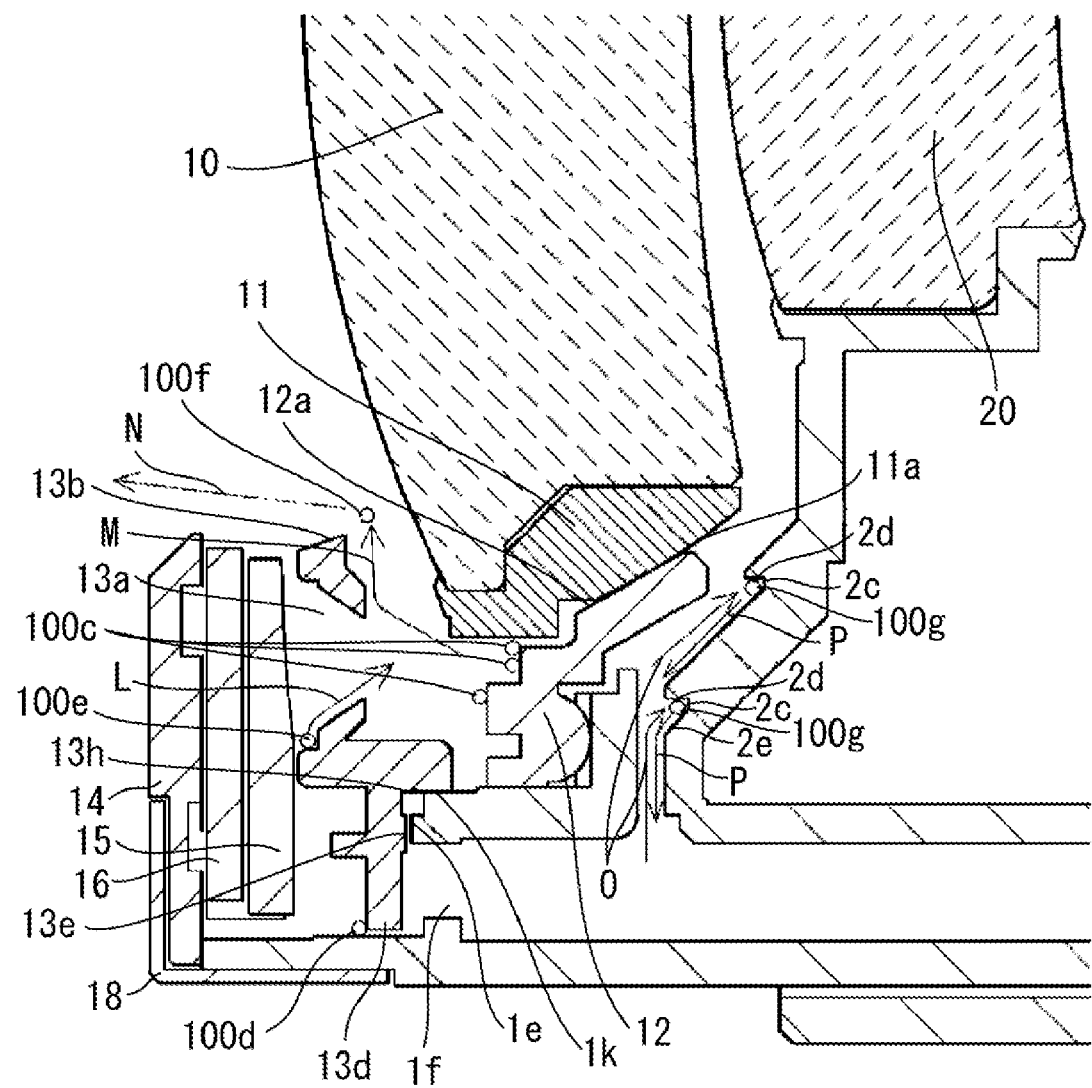
FIG. 4 is a partially enlarged view of the wide-angle end of the lens barrel of FIG. 3.

FIG. 1 is a cross sectional view illustrating a lens barrel (in a retracted state) with a barrier mechanism according to a first embodiment of the present invention. FIG. 2 is a partially enlarged view of the lens barrel of FIG. 1. FIG. 3 is a cross sectional view of the lens barrel of FIG. 1 illustrating a wide-angle end in a photo-taking state. FIG. 4 is a partially enlarged view of the lens barrel of FIG. 3.

Figure 5:
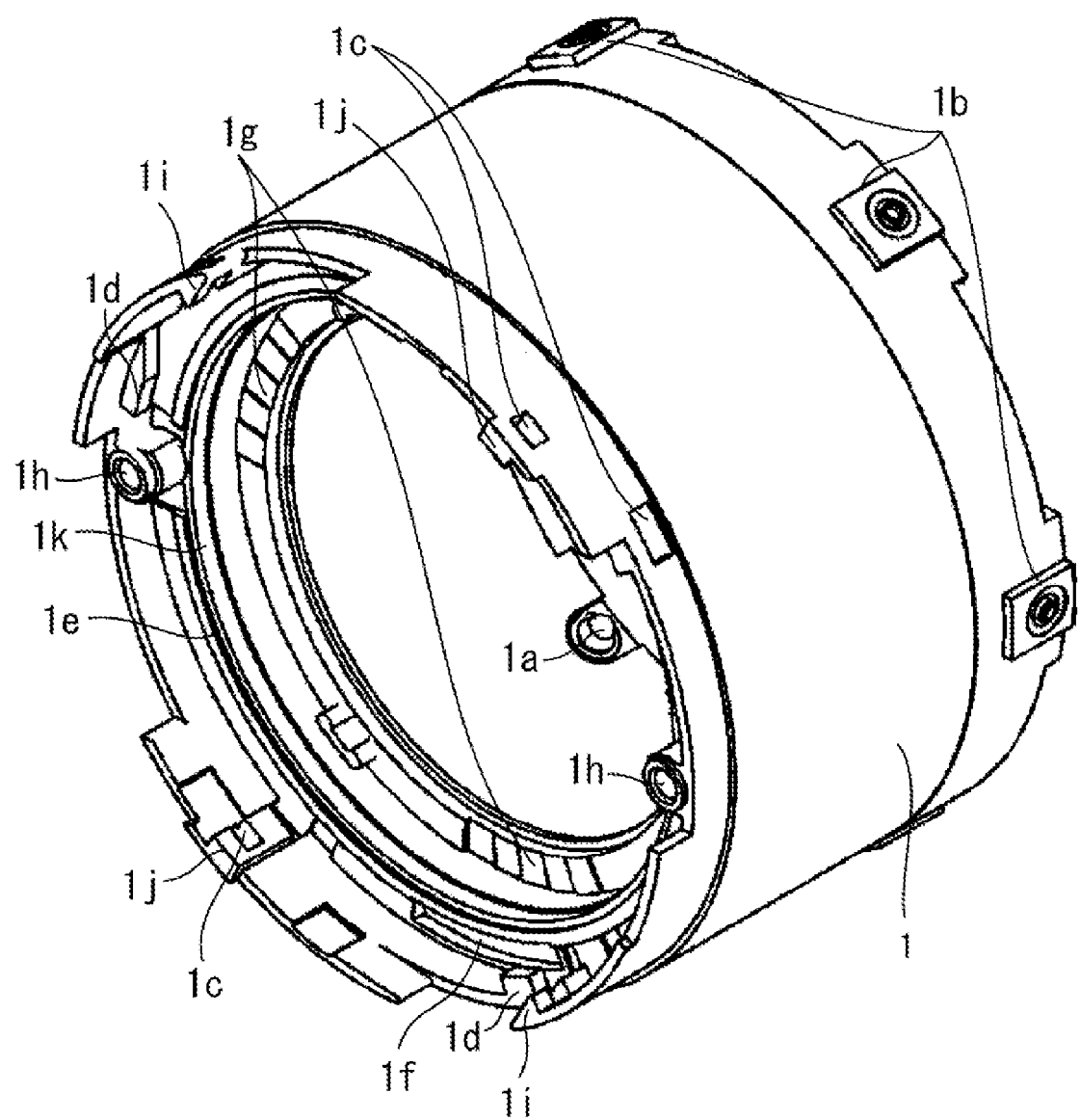
FIG. 5 is a perspective view of a first lens unit barrel.

FIG. 5 is a perspective view of a first lens unit barrel.

Figure 6:
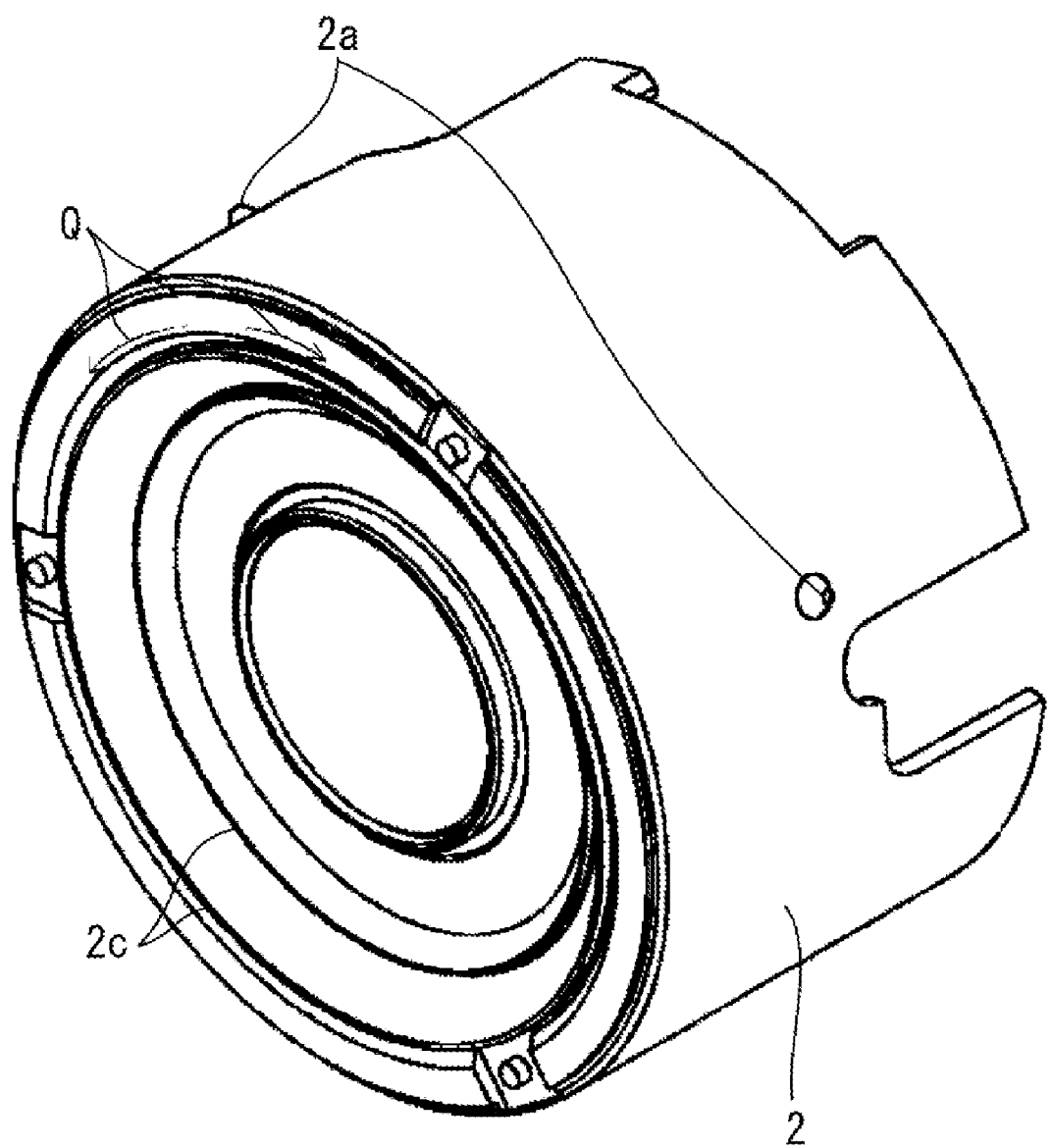
FIG. 6 is a perspective view of a second lens unit barrel.

FIG. 6 is a perspective view of a second lens unit barrel.

Figure 7:
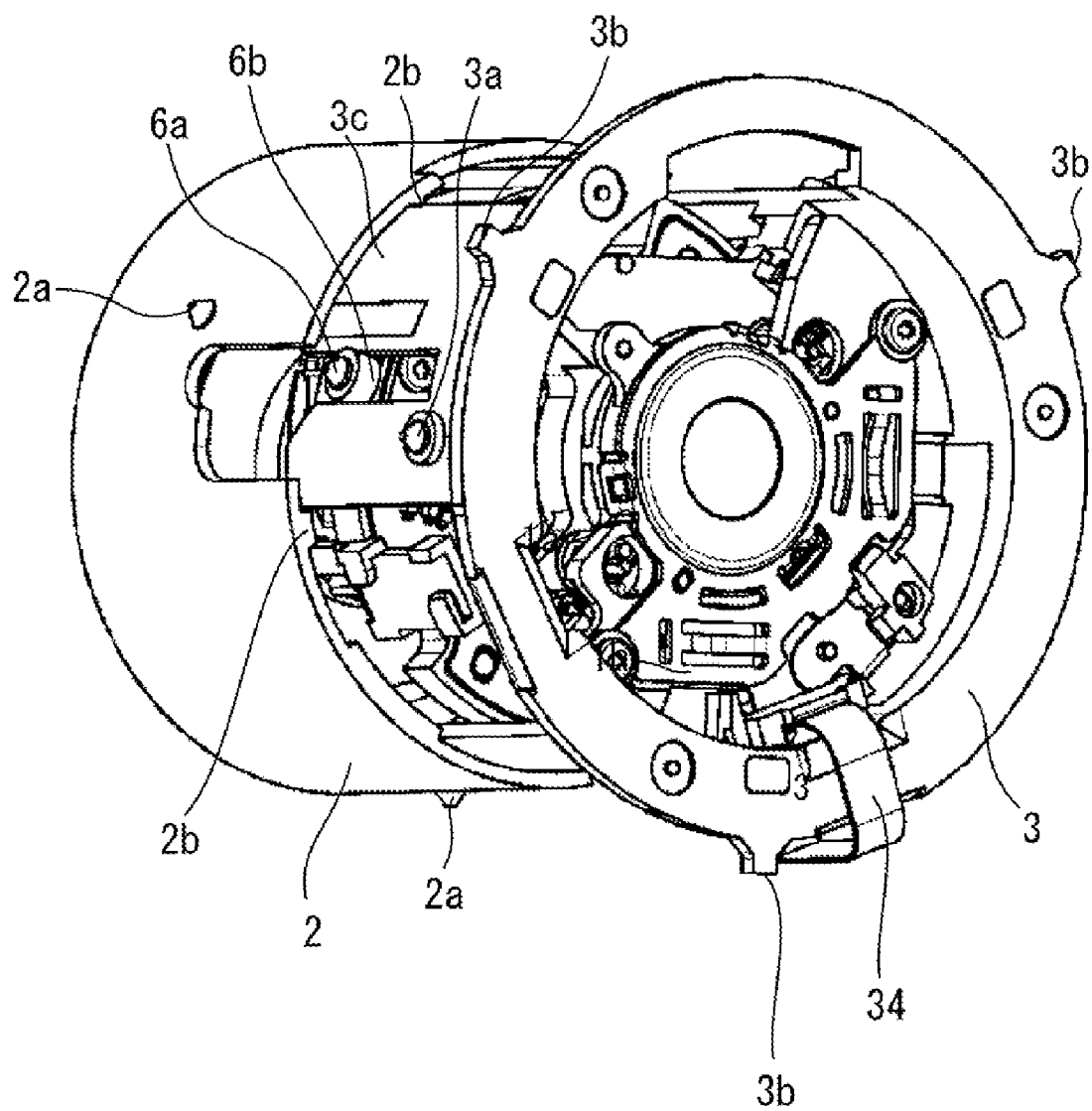
FIG. 7 is a perspective view illustrating a relationship among the second lens unit barrel, a third lens unit barrel, and a diaphragm-shutter unit.

FIG. 7 is a perspective view illustrating a relationship among the second lens unit barrel, a third lens unit barrel, and a diaphragm-shutter unit.

As illustrated in FIGS. 1 through 4, the lens barrel includes a first lens unit barrel 1, a second lens unit barrel 2, a third lens unit barrel 3, a fourth lens unit barrel 4, a charge-coupled device (CCD) holder 5, a diaphragm-shutter unit 6, a moving cam 71, a drive tube 73, a rectilinear motion tube 74, and a cover tube 75 which covers the entire barrel for protection.

The first lens unit barrel 1 includes therein a first lens unit 10 and moves in an optical axis direction together with the first lens unit 10. The first lens unit 10 is held by a first lens unit holder frame 11 and is fixed to the first lens unit barrel 1 through a first lens unit adjustment ring 12. The first lens unit 10 has a convex lens having an optically positive power.

Metal cam pins 1a are press-fit into the first lens unit barrel 1 at an inner circumferential side of the first lens unit barrel 1 in an integral manner. Also, stepped receiving surfaces 1g (FIG. 5) are provided at three positions on the first lens unit barrel 1. The height of the receiving surfaces 1g which receive a surface of the first lens unit adjustment ring 12 in an optical direction can be changed in accordance with the angular phase for constructing the first lens unit adjustment ring 12, thereby adjusting the position of the first lens unit 10 in the optical axis direction.

A spherical R surface 11a which contacts a conical surface 12a of the first lens unit adjustment ring 12 is provided on the first lens unit holder frame 11. The first lens unit 10 is configured to be tilt-adjustable in order to produce the optimum optical performance of the entire photographic lens by changing an angle of the first lens unit holder frame 11.

After adjusting the tilting degree of the first lens unit 10 and bonding the first lens unit 10, a barrier mechanism to be described below is incorporated into the first lens unit barrel 1 and then the first lens unit barrel 1 is covered with a decorative laminated sheet 18.

The second lens unit barrel 2 has a second lens unit 20. The second lens unit barrel 2 rectilinearly moves in accordance with the movement of the cam pins 2a (see FIG. 6) along a cam groove 71e of a moving cam ring 71 in the optical axis direction. The cam pins 2a is integrated with the second lens unit barrel 2.

Two grooves 2c coaxial with the second lens unit 20 are formed at portions of the second lens unit barrel 2 which face an object side in a circumference direction. A wall on the inner circumferential sides of the grooves 2c is formed as cylindrical surfaces 2d which are nearly in parallel with the optical axis. A wall of the outer circumferential sides of the grooves 2c is formed as taper surfaces 2e in their entirety. The taper surfaces 2e gradually expand in diameter toward the object side.

As shown by arrows O of FIG. 4, the cylindrical surfaces 2d on the inner circumferential sides of the grooves 2c catch dust 100g such as sand or dirt, when the dust 100g comes into the lens unit, preventing the dust 100g from reaching up to the central second lens unit 20.

Further, the diameter of each of the grooves 2c is larger than the diameter of the first lens unit 10 at a R2 surface side. Accordingly, when a user views from the object side, the user can hardly see the grooves 2c from the object side even if the first lens unit 10 is magnified by a convex lens.

The cylindrical surfaces 2d of the inner circumferential sides of the grooves 2c are formed throughout the entire circumference. Accordingly, as shown by arrows Q of FIG. 6, the dust 100g residing at top sides of the grooves moves following the grooves 2c in the direction of the arrows Q (toward a bottom side), provided that gravity acts downward on the bottom sides of the grooves.

Also, when the lens barrel is moved to change its position or when an outer force such as gravity is applied to the lens barrel, the dust 100g caught by the grooves 2d is discharged in the direction of an arrow P (FIG. 4) to the outside of the optical axis following the entire taper surfaces 2e on the outer circumferential sides of the grooves 2c. Accordingly, the dust hardly enters an area that is visible through the first lens unit 10.

In a third lens unit barrel 3, a third lens unit 30 is held by a third lens unit holder frame 31. The third lens unit holder frame 31 is formed integrally with two magnets 31a and is pressed in the optical axis direction by springs (not shown) against the third lens unit barrel 3 through three balls 35.

The third lens unit barrel 3 is provided with a coil 32 and a hall element 33 which are fixed across the magnets 31a of the third lens unit holder frame 31, and the coil 32 and the hall element 33 are connected to a control substrate (not shown) through a flexible circuit board 34.

When power is supplied to the coil 32 from the flexible circuit board 34, the third lens unit holder frame 31 receives electromagnetic power in a direction orthogonal to the optical axis within the third lens unit barrel 3, and the above described balls 35 become rolling elements which can move on a plane surface orthogonal to the optical axis.

Since the output varies according to the positional change of the magnets 31a, the hall element 33 can detect the moving distance of the third lens unit holder frame 31 based on the output variation.

A fourth lens unit barrel 4 holds a fourth lens unit 40, and is movable in the optical axis direction. The fourth lens unit barrel 4 can pivot supported by two guide bars (not shown). A motor shaft of an AF motor 42 which drives the fourth lens unit barrel 4 is provided with a screw 42a, and the screw 42a receives a nut 41 screwed thereinto.

The fourth lens unit barrel 4 is pressed against the nut 41 by a tension spring (not shown) in the optical axis direction. The nut 41 is moved in the optical axis direction by a driving force of the AF motor 42 so that the fourth lens unit barrel 4 moves in the optical axis direction.

A CCD holder 5 is a frame for holding a CCD sensor 50. An elastic member 52 such as rubber or the like is arranged at the object side of the CCD sensor 50, and an infrared (IR) cut filter 51 is arranged between the elastic member 42 and the CCD sensor 50.

The elastic member 52, the IR cut filter 51, and the CCD sensor 50 are formed as a unit arranged between an IR plate 54 and a CCD plate 53 in the optical axis direction. The unit is press-secured to the CCD holder 5 through a screw (not shown).

A diaphragm-shutter unit 6 is connected to a control substrate (not shown) through a flexible circuit board 63. The diaphragm-shutter unit 6 has two shutter blades 61 at the object side and six diaphragm blades 62 at the imaging surface side.

The two shutter blades 61 can be electrically opened/closed through an electromagnetic drive. The six diaphragm blades 62 open/close at the same time when a motor (not shown) is driven, and the diameter of a diaphragm aperture is varied to control a diaphragm value.

A moving cam ring 71 includes a cam groove 71d formed at an outer circumferential side of the moving cam ring 71 as well as includes a cam groove 71e, a cam groove 71f, a cam groove 71g formed at the inner circumferential side of the moving cam ring 71. Further, the moving cam ring 71 includes a cam pin 71a, a drive pin 71b, and a claw 71c that are integrally formed.

A stationary tube 72 includes a cam groove 72a at an inner circumferential side of the stationary tube 72, and therefore, the cam pin 71a of the moving cam ring 71 can move along the cam groove 72a.

A drive tube 73 fits into an outer circumferential portion of the stationary tube 72 in a rotatable manner, and a gear portion (not shown) is formed integrally at the outer circumferential side. The gear portion is connected to a not-shown power zoom (PZ) motor through a decelerating mechanism (not shown).

A rectilinear motion tube 74 includes a key portion 74a at an end of the outer circumferential portion on the imaging surface side, and the key portion 74a fits into the groove 72b formed at an inner circumferential side of the stationary tube 72, such that the rectilinear motion tube 74 is movable along the groove 72b in the optical axis direction while a rotation is controlled.

Relative movement of the key portion 74a is controlled by the claw 71c of the moving cam ring 71 in the optical axis direction, such that the rectilinear motion tube 74 moves without rotating in the optical axis direction together with the moving cam ring 71 which moves in the optical axis direction while it is rotating.

Now, an example of an operation of the lens barrel having the above-described structure will be described below.

Driven by rotation of the PZ motor, the drive tube 73 is rotated. A longitudinal groove 73a is formed at an inner circumferential side of the drive tube 73 in the optical axis direction. Drive pins 71b of the moving cam ring 71 fit into the longitudinal groove 73a to move rectilinearly in the optical axis direction relative to the drive tube 73.

Further, since the drive pins 71b fit into the longitudinal groove 73a, the drive tube 73 rotates together with the moving cam ring 71, so that the moving cam ring 71 moves in the optical axis direction following the cam groove 72a while it rotates.

When the cam pins 71a of the moving cam ring 71 rectilinearly move, while these rotate, in the optical axis direction along the cam groove 72a of the stationary tube 72, a rectilinear motion key 1b of the first lens unit barrel 1 moves along a rectilinear groove (not shown) of the rectilinear motion tube 74. Thus, the first lens unit barrel 1 rectilinearly moves in the optical axis direction without rotating.

The metal cam pins 1a at the inner circumferential side of the first lens unit barrel 1 move along the cam groove 71d of the outer circumferential side of the moving cam ring 71 so that the first lens unit barrel 1 moves in a back and forth direction in the optical axis direction.

Similarly, the cam pins 2a and the rectilinear ribs 2b are formed integrally with the second lens unit barrel 2; the cam pins 3a, the rectilinear motion keys 3b, and the rectilinear motion ribs 3c are formed integrally with the third lens unit barrel 3; and the cam pins 6a and the rectilinear motion keys 6b are formed integrally with the diaphragm-shutter unit 6 (see FIG. 7).

The cam pins 2a move following the cam groove 71e, the cam pins 3a move following the cam groove 71f, and the cam pins 6a move following the cam groove 71g, respectively.

Referring to FIG. 7, each of the rectilinear motion ribs 3c of the third lens unit barrel 3 is made of a pair of ribs, and the rectilinear motion keys 6b of the diaphragm-shutter unit 6 are arranged between the two ribs such that the rectilinear motion ribs 2b of the second lens unit barrel 2 sandwich the outsides of the two ribs in the circumferential direction.

The second lens unit barrel 2, the third lens unit barrel 3, and the diaphragm-shutter unit 6 rectilinearly move in the optical axis direction without rotating.

In the third lens unit barrel 3, the rectilinear motion keys 3b fit into the rectilinear motion groove 72b of the stationary tube 72 from the back of the rectilinear motion tube 74, and the third lens unit barrel 3 moves in the optical axis direction without rotating so that the second lens unit barrel 2 and the diaphragm-shutter unit 6 also can move rectilinearly in the optical axis direction without rotating.

As described above, the rotation of the PZ motor causes positions of the first lens unit 10, the second lens unit 20, the third lens unit 30, and the diaphragm-shutter unit 6 to move in the optical axis direction.

Then, a curve for each of the cam grooves is suitably designed such that an optical system can be moved from a retracted position to a position of photo-taking state, and from a position of a wide-angle end to a position of a telephoto end in a zoom area of the optical system.

Now, referring to FIGS. 8 through 15, a barrier mechanism according to the first exemplary embodiment of the present invention will be described below.

Figure 8:
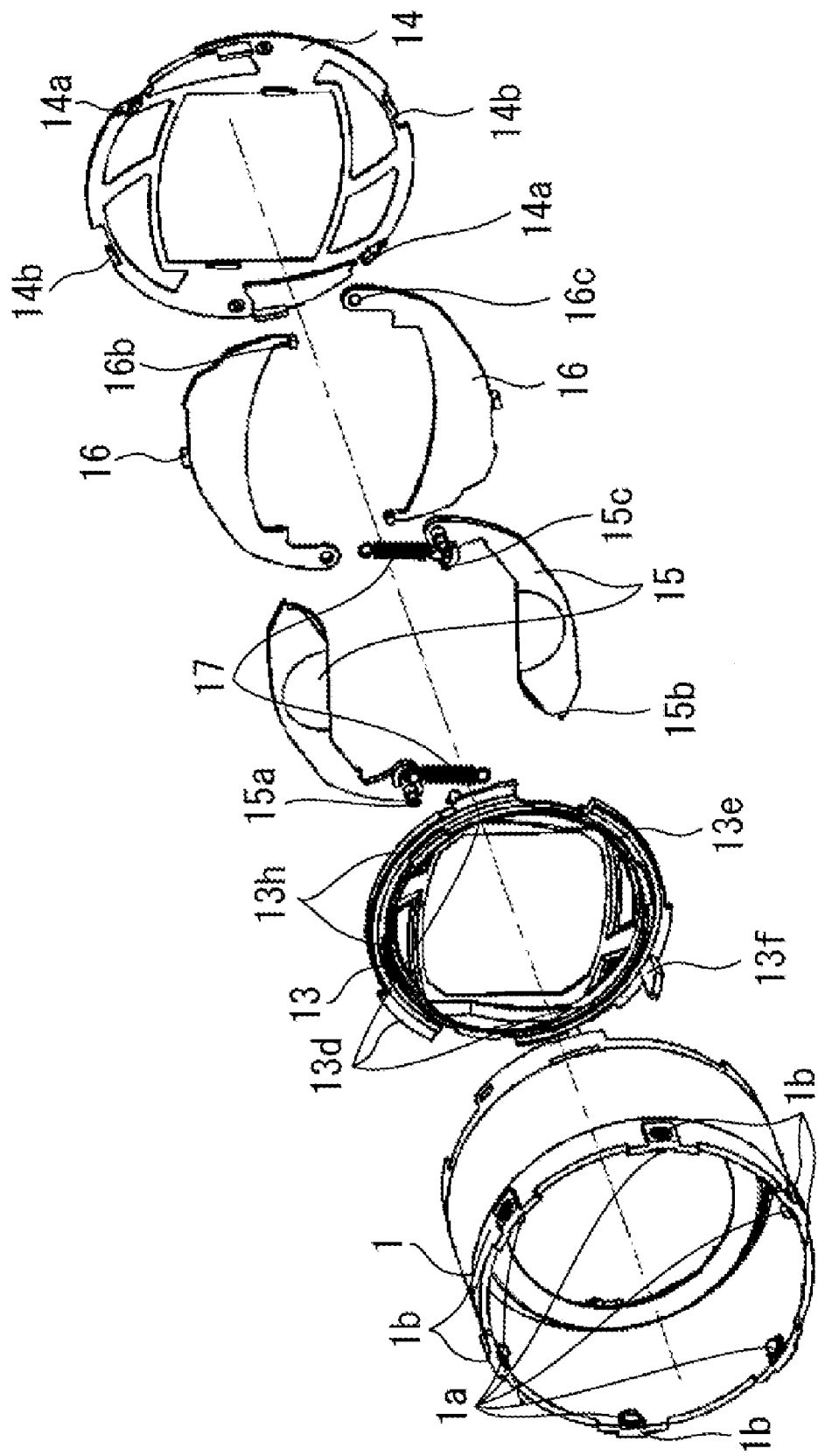
FIG. 8 is an exploded perspective view illustrating a barrier mechanism according to the first embodiment of the present invention.
Figure 9:
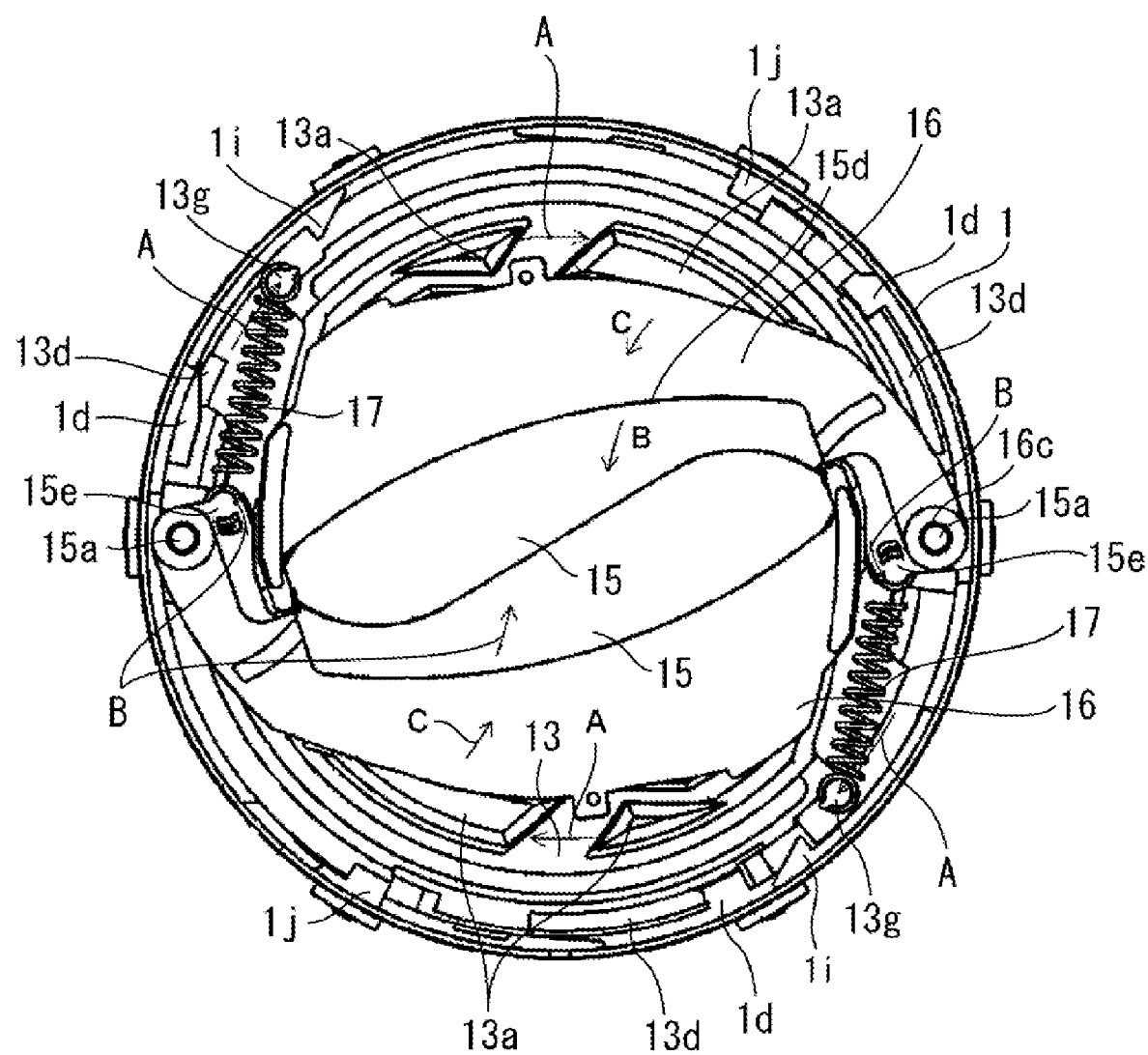
FIG. 9 is a front view of the barrier mechanism of FIG. 8 with barrier blades of the barrier mechanism closed.
Figure 10:
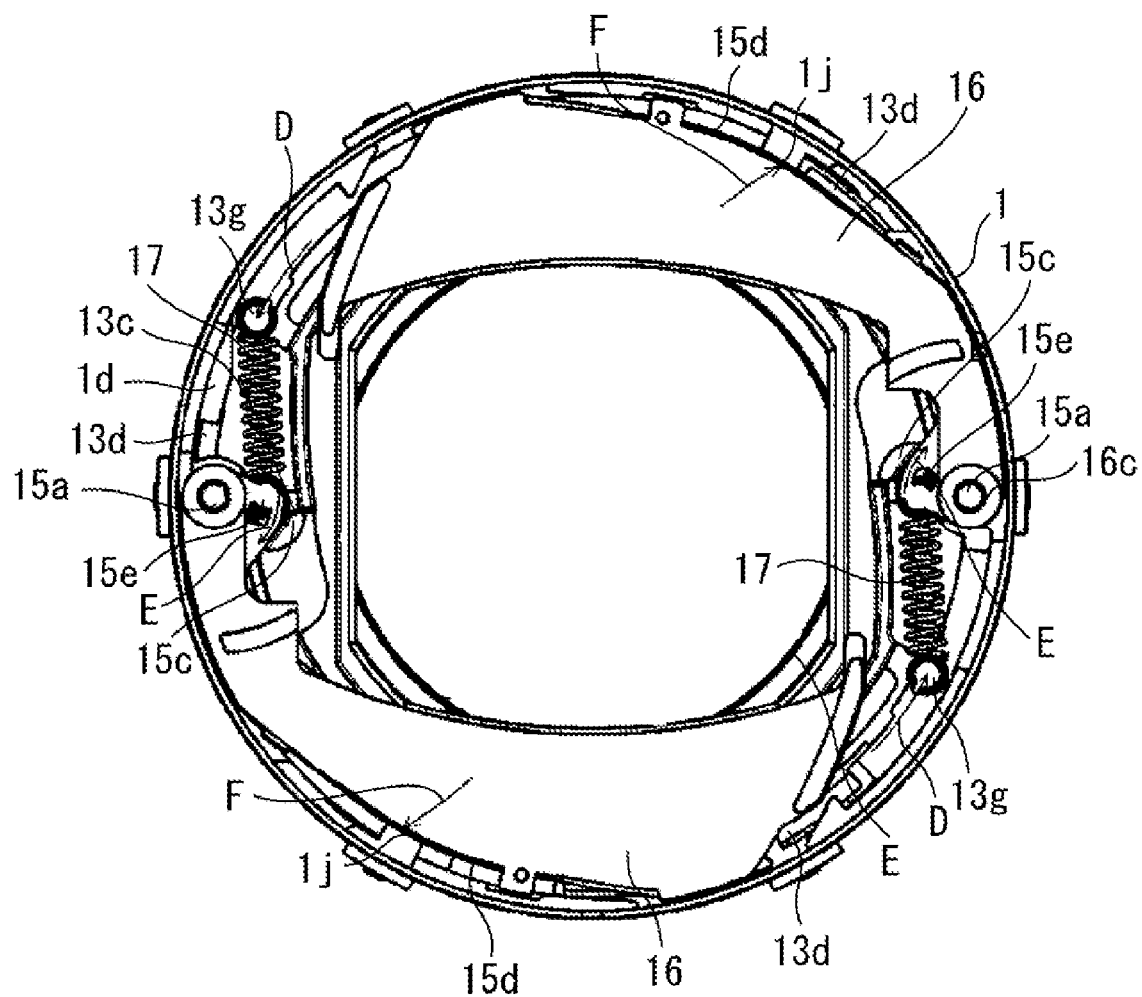
FIG. 10 is a front view of the barrier mechanism of FIG. 8 with the barrier blades of the barrier mechanism open.
Figure 11:
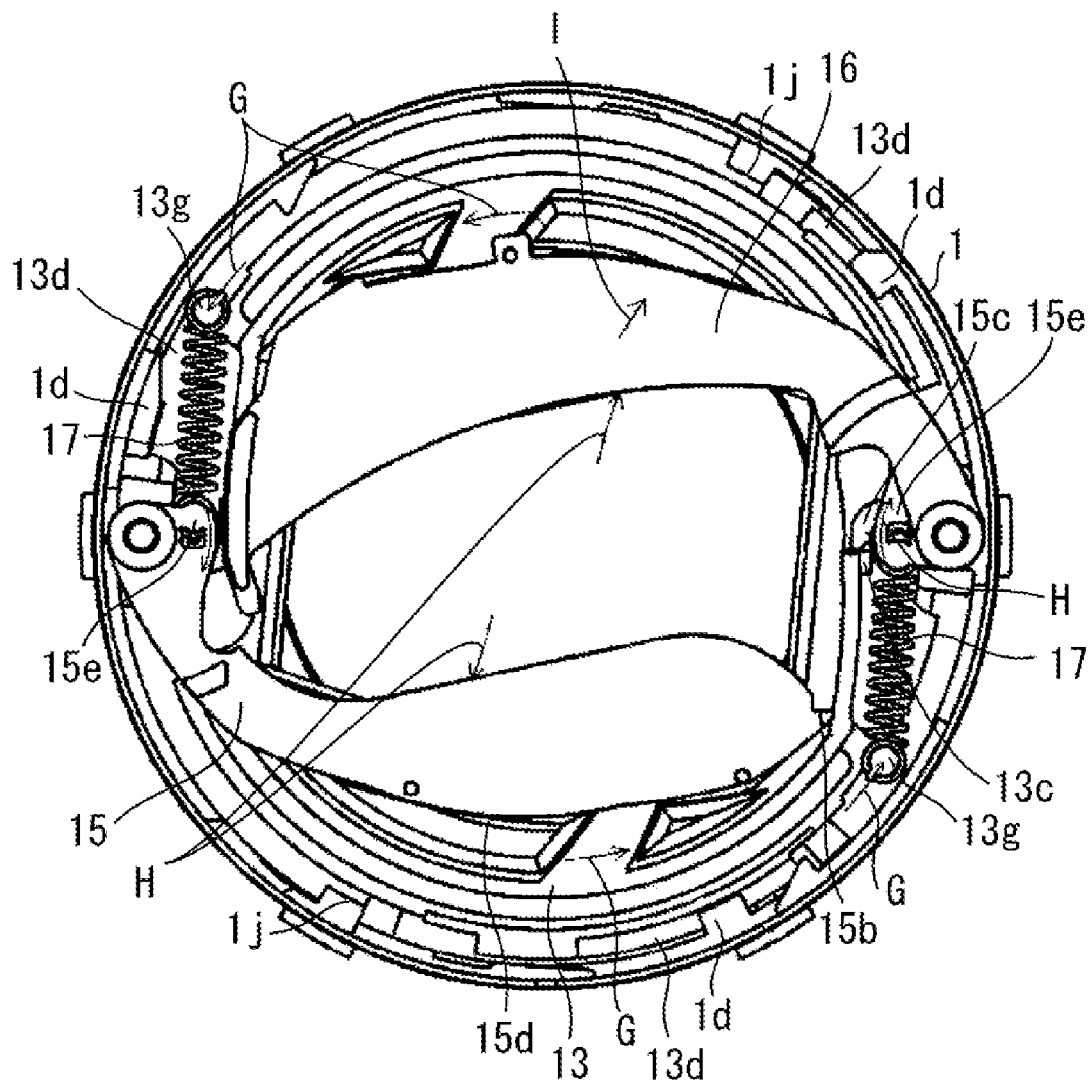
FIG. 11 is a front view of the barrier mechanism of FIG. 8 with the barrier blades of the barrier mechanism about to open while rotating.

FIG. 8 is an exploded perspective view illustrating a barrier mechanism according to the present embodiment. FIG. 9 is a front view of the barrier mechanism of FIG. 8 with barrier blades of the barrier mechanism closed. FIG. 10 is a front view of the barrier mechanism of FIG. 8 with barrier blades of the barrier mechanism open. FIG. 11 is a front view of the barrier mechanism of FIG. 8 with barrier blades that is being opened in the middle of rotating.

Figure 12:
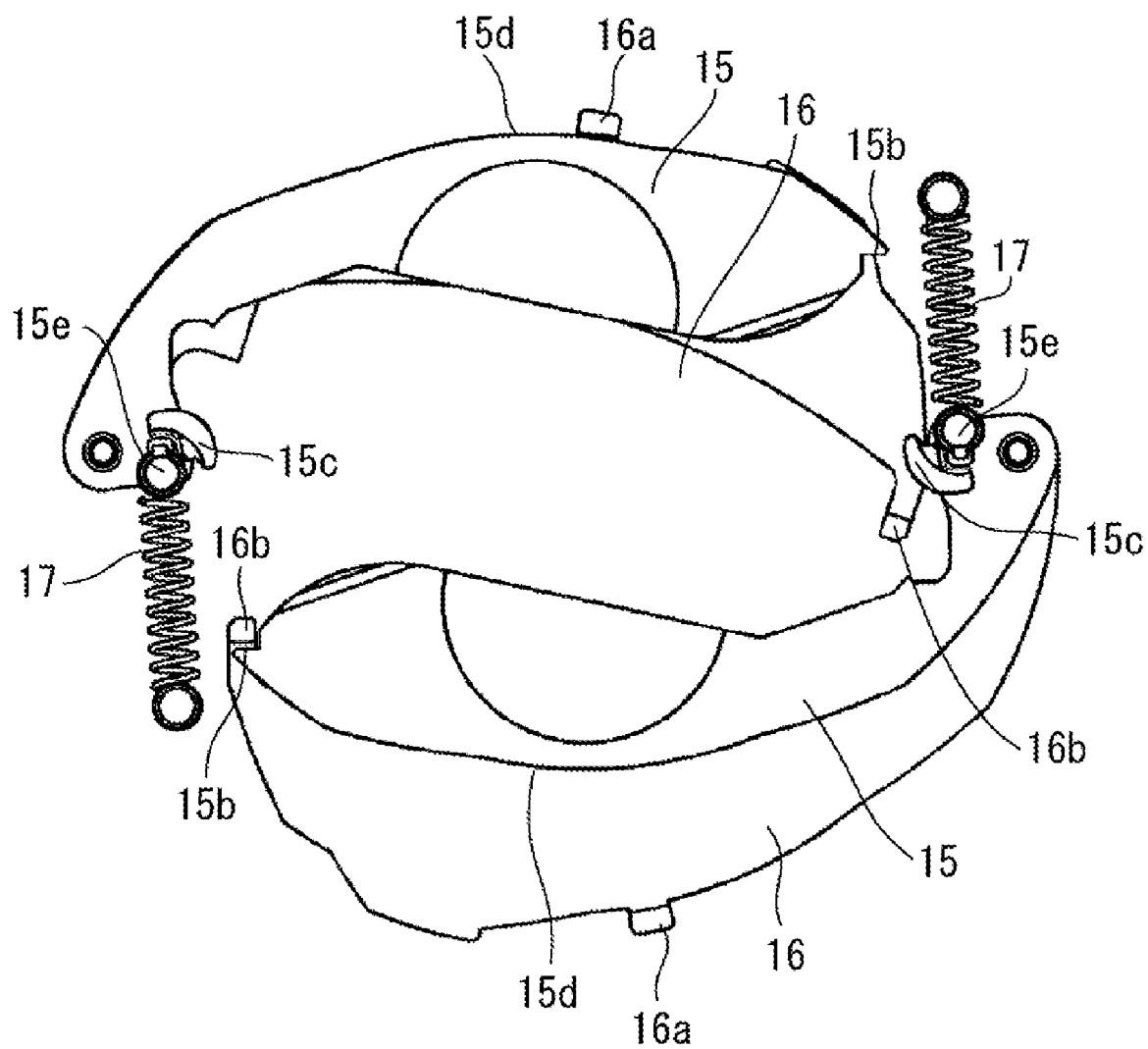
FIG. 12 is a view of two pairs of barrier blades viewed from an imaging surface side.
Figure 13:
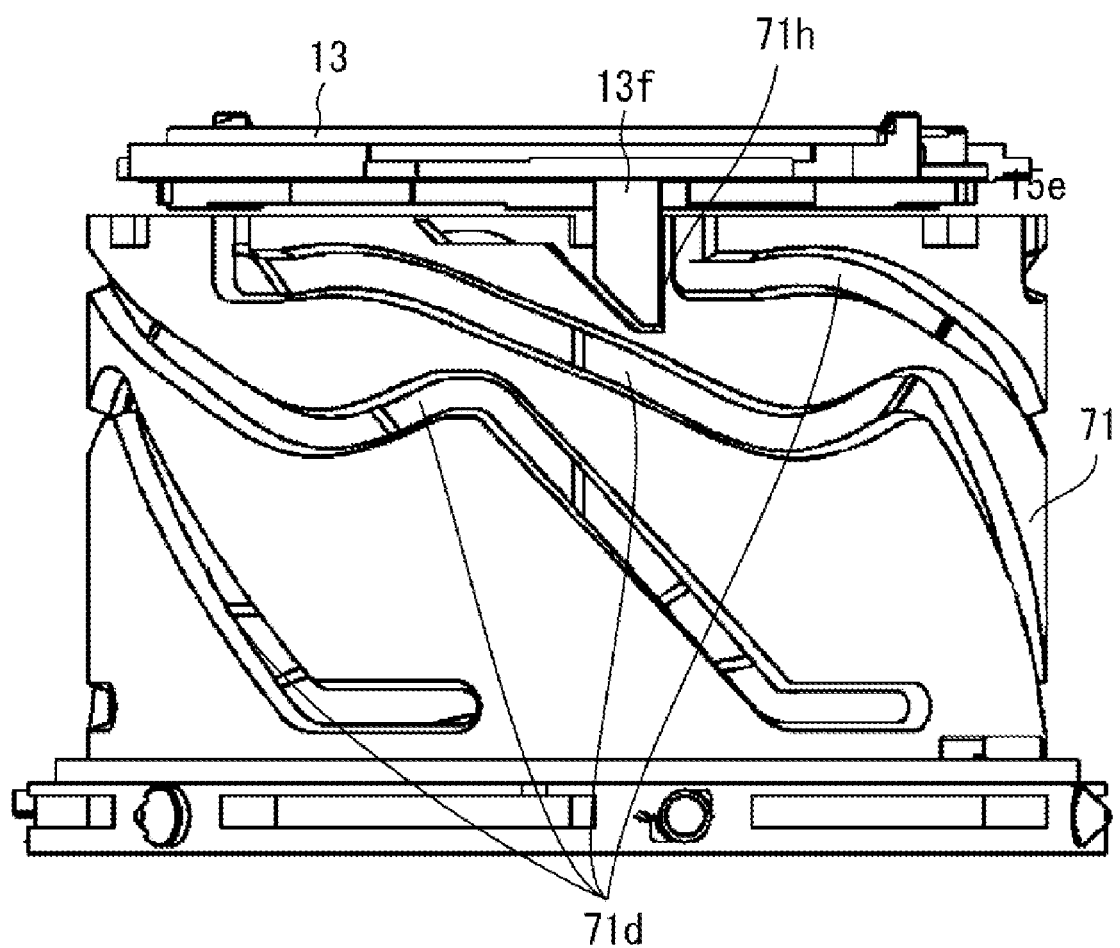
FIG. 13 is a view illustrating a relationship between a barrier drive ring and a moving cam ring.
Figure 14:
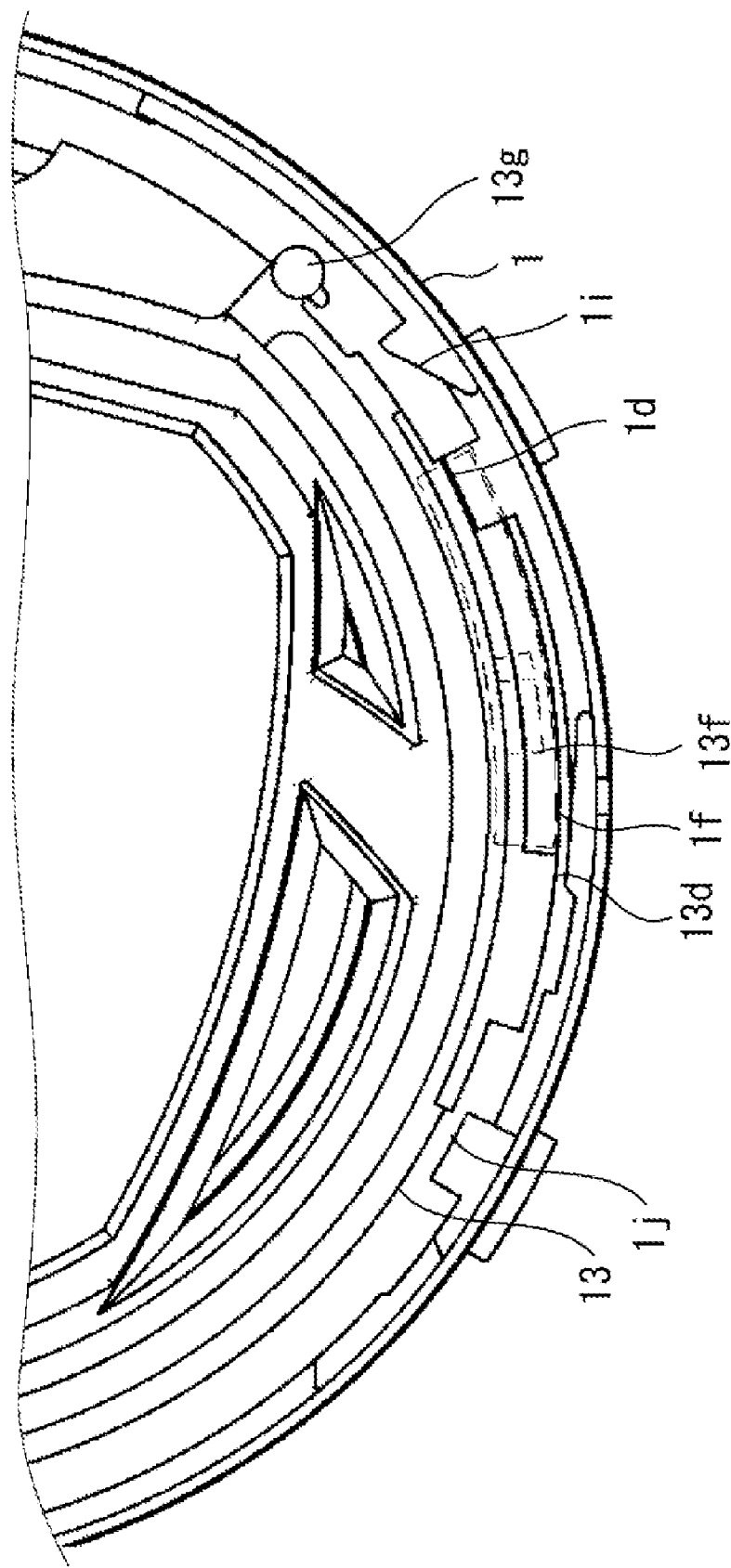
FIG. 14 is a partially enlarged view of the first lens unit barrel and the barrier drive ring.
Figure 15:
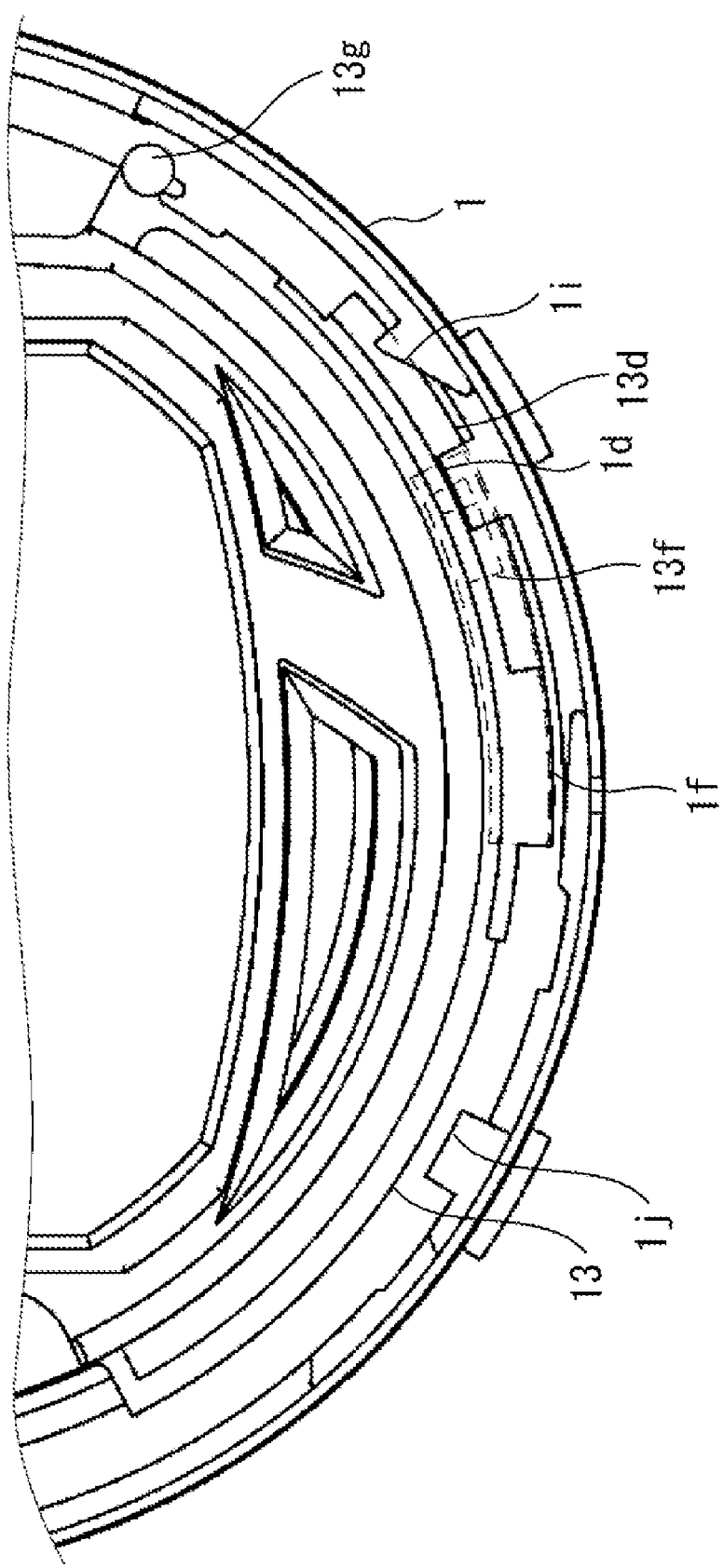
FIG. 15 is a partially enlarged view of the first lens unit barrel and the barrier drive ring.

FIG. 12 is a view of two pairs of barrier blades viewed from an imaging surface side. FIG. 13 is a view illustrating a relationship between the barrier drive ring and the moving cam ring. FIGS. 14 and 15 are partially enlarged views of the first lens unit barrel and the barrier drive ring.

As illustrated in FIG. 8, the barrier mechanism according to the present embodiment includes a barrier drive ring (barrier drive member) 13, a barrier cover 14, inner barrier blades 15, outer barrier blades 16, and springs 17.

The barrier drive ring 13 is provided with flange portions 13d at three portions in a circumferential direction to project outwardly in a radial direction, as shown in FIGS. 8 and 9. The flange portions 13d are fit into and caught by bayonet claws 1d at three portions of the first lens unit barrel 1 in a bayonet structure, such that the positions of the flange portions 13d in the optical axis direction are controlled from the object side.

At the imaging surface side, referring to FIG. 3, a rail portion 13e of the barrier drive ring 13 contacts a rail portion 1e of the first lens unit barrel 1 to slidably move, so that positions in the optical axis direction are controlled. Also, in a direction orthogonal to the optical axis direction, radial fit holes 1k of the first lens unit barrel 1 are engaged with radial fit portions 13h of the barrier drive ring 13 to keep the barrier drive ring 13 in a rotatable state.

As illustrated in FIG. 9, tapered holes 13a, which are tapered from the imaging surface side to the object side, are formed in the barrier drive ring 13. The holes 13a are positioned outside the outer circumferences 15d of the inner barrier blades 15 in the radial direction and approximately outside the outer barrier blades 16 in the radial direction when the barrier member is closed.

Also, the holes 13a are arranged at engagement portions between the radial fit portions 13h of the barrier drive ring 13 and the radial fit holes 1k of the first lens unit barrel 1, and inside a sliding portion between the rail portion 13e and the rail portion 1e in the radial direction.

Referring to FIGS. 2 and 3, the outer circumferences of the holes 13a on the imaging surface side are formed into tapered shapes which become narrower toward the imaging surface side.

In other words, the outer circumferences are tapered with the thinner holes 13a on the imaging surface side. Accordingly, the dust once having come into the holes 13a hardly goes out from the holes 13a again when the user aims the lens barrel downward, and can easily go out from the opening portions 13b of the first lens unit 10.

The barrier cover 14 is a covering member including opening holes for the first lens unit 10, and includes at an outer circumferential portion two claws 14a and two claws 14b.

The claws 14a and the claws 14b are caught by the bayonet claws 1i and bayonet claws 1j of the first lens unit barrel 1 by rotating the barrier caver 14. As a result, the barrier cover 14 is secured to the first lens unit barrel 1. The barrier cover 14 is not shown in FIGS. 9 through 11 for the sake of simplicity of description.

The two inner barrier blades 15 and the two outer barrier blades 16 are arranged to be opened/closed such that they rotate in a symmetry direction. When the two inner barrier blades 15 and the two outer barrier blades 16 are closed, they cover the opening holes of the barrier cover 14 to protect the first lens unit 10.

Base portions of the inner barrier blades 15 are provided with shafts 15a projecting from both the front and back sides. One of the shafts 15a fits into a hole 1h of the first lens unit barrel 1, and another of the shafts 15a fits into a hole 16c of the outer barrier blades 16. Accordingly, the inner barrier blades 15 and the outer barrier blades 16 become coaxially rotatable around the shafts 15a.

The outer circumferences 15d of the inner barrier blades 15 are caught by the claws 16a of the outer barrier blades 16 when the barrier blades are opened, whereas top portions 15b of the inner barrier blades 15 are caught by the claws 16b of the outer barrier blades 16 when the barrier blades are closed. Accordingly, the outer barrier blades 16 are rotatably driven in association with the movement of the inner barrier blades 15.

The springs 17 are tension springs, and are bridged between the hook portions 15e of the two inner barrier blades 15 and the shafts 13g of the barrier drive ring 13 to pull the two inner barrier blades 15 to each other. An interlocking lever 13f of the barrier drive ring 13 passes through the hole 1f of the first lens unit barrel 1. When the barrel is retracted, the interlocking lever 13f is positioned such that its top reaches up to the moving cam ring 71.

As illustrated in FIG. 13, the moving cam ring 71 includes a notch portion 71h at a position corresponding to the interlocking lever 13f, and the notch portion 71h pushes the interlocking lever 13f in a rotation direction to perform rotation.

As illustrated in FIG. 5, the bayonet claws 1d, 1i, and 1j of the first lens unit barrel 1 are all formed such that they slide in a lateral direction orthogonal to the optical axis. Consequently, lateral holes 1c for slide-molding are formed at all the imaging surface sides of the bayonet claws 1d, 1i, and 1j. The lateral holes 1c are covered by a decorative laminated sheet (cover member) 18 which does not allow the dust to enter.

As a result, the first lens unit barrel 1 includes, in addition to the hole 1f, through-holes only in holes 1h into which the shafts 15a of the inner barrier blades 15 fit and in a portion into which the first lens unit 10 fits. The holes 1h are covered by the inner barrier blades 15. The portion into which the first lens unit 10 fits is covered by the first lens unit 30, the first lens unit holder frame 11, and the first lens unit adjustment ring 12.

As illustrated in FIGS. 14 and 15, the hole 1f is positioned such that the interlocking lever 13f of the barrier drive ring 13 is arranged in the same phase as one of the three flange portions 13d. While the barrier blades are being operated from an open state to a closed state, an angular area of the flange portion 13d is large enough to always cover the hole 1f with the flange portion 13d.

Accordingly, while the flange portion 13d of the interlocking lever 13f rotates by a rotation of the barrier drive ring 13 from the open state to the closed state of the barrier blades, the hole 1f can always be covered with the flange portion 13d. As a result, as illustrated in FIG. 4, it becomes possible to prevent the dust 100d from coming in through the hole 1f.

When the inner barrier blades 15 and the outer barrier blades 16 are closed, the barrier drive ring 13 rotates in association with rotation of the moving cam ring 71 owing to the effect of the notch portion 71h of the moving cam ring 71 and the interlocking lever 13f as illustrated in FIG. 13. Accordingly, the inner barrier blades 15 and the outer barrier blades 16 rotate in a closing direction.

When the barrier is in the closed state, the interlocking lever 13f is pushed by the moving cam ring to be rotated in the direction of the arrow A of FIG. 9. As a result, the barrier drive ring 13 receives a force in the direction of an arrow A around the optical axis and is rotated up to a phase of a closed position.

At this time, the springs 17 are charged, and one of the two inner barrier blades 15 is pulled by the springs 17 and is rotated in directions of arrows B around the shafts 15a. The pulled inner barrier blade 15 stops the rotation at the position where it contacts with another inner barrier blade 15.

The inner barrier blades 15 cause also the outer barrier blades 16 to rotate in directions of arrows C, so that the inner barrier blades 15 and the outer barrier blades 16 are closed.

When the inner barrier blades 15 and the outer barrier blades 16 are opened, the force applied to the interlocking lever 13f by the rotation of the moving cam ring 71 is released and the barrier drive ring 13 is rotated in the direction of an arrow G due to a force by charged springs 17, as illustrated in FIG. 11.

As a result of the above, in the barrier drive ring 13, when a wall 13c of the barrier drive ring 13 pushes projections 15c of the inner barrier blades 15 in a certain phase, the inner barrier blades 15 start to rotate under a rotation force in directions of arrows H.

At this time, since the outer circumferences 15d of the inner barrier blades 15 contact the claws 16a of the outer barrier blades 16, the outer barrier blades 16 also start to rotate in directions of arrows I. In FIG. 11, only one of the outer barrier blades 16 is removed.

Also, when the notch portion 71h of the moving cam ring 71 is moved away from the interlocking lever 13f, the barrier drive ring 13 further rotates in a direction of an arrow D which is the direction the spring 17 relaxes since nothing controls the rotation of the barrier drive ring 13.

The bayonet claws 1j serve as stoppers of the inner barrier blades 15. The inner barrier blades 15 rotate in the direction of an arrow E until the outer circumferences 15d of the inner barrier blades 15 contact the bayonet claws 1j. The outer barrier blades 16 are also pushed by the outer circumferences 15d of the inner barrier blades 15 to rotate together with the outer circumferences 15d of the inner barrier blades 15 in directions of arrows F. Thus, the mechanism goes into a barrier open state as illustrated in FIG. 10.

If dust is caught between the inner barrier blades 15 and the barrier drive ring 13 while the inner barrier blades 15 is driven to open, by the rotation of the inner barrier blades 15, the dust 100e of FIG. 4 is swept away to positions of dust 100c in the direction of an arrow L through the holes 13a of the barrier drive ring 13.

Also, while the inner barrier blades 15 are in the closed state, if the dust 100a of FIG. 2 comes through a space between the inner barrier blades 15 and the outer barrier blades 16 and attaches to side surfaces of the blades, the dust 100a can be swept into positions of dust 100c through the holes 13a of the barrier drive ring 13 in the direction of an arrow J.

Similarly, if dust 100b of FIG. 2 comes in through a space between the outer barrier blades 16 and the barrier cover 14 and attaches to side surfaces of the blades, the dust 100b can be swept into positions of the dust 100c through the holes 13a of the barrier drive ring 13 in the direction of an arrow K.

Also, the tapered holes 13a come to rotate around the outer circumferences 15d of the inner barrier blades 15, so that the attaching dust in a wider range of the blades can be swept away into the holes 13a.

Further, since almost all of the positions of the tapered holes 13a are covered by the inner barrier blades 15 when the barrier is open, the dust can be prevented from coming out through the holes 13a when the barrier is open, while dust 100f comes out through lens opening portions 13b in the direction of an arrow M and in the direction of an arrow N of FIG. 4.

Thus, the dust hardly reaches the radial fit portions 13h, the rail portion 13e, and the flange portions 13d of the barrier drive ring 13. Accordingly, interference of the dust with the movement of the barrier drive ring 13 is suppressed.

Second Embodiment

Now, a barrier mechanism according to a second embodiment of the present invention will be described below with reference to FIGS. 16 through 18, and 22.

Figure 16:
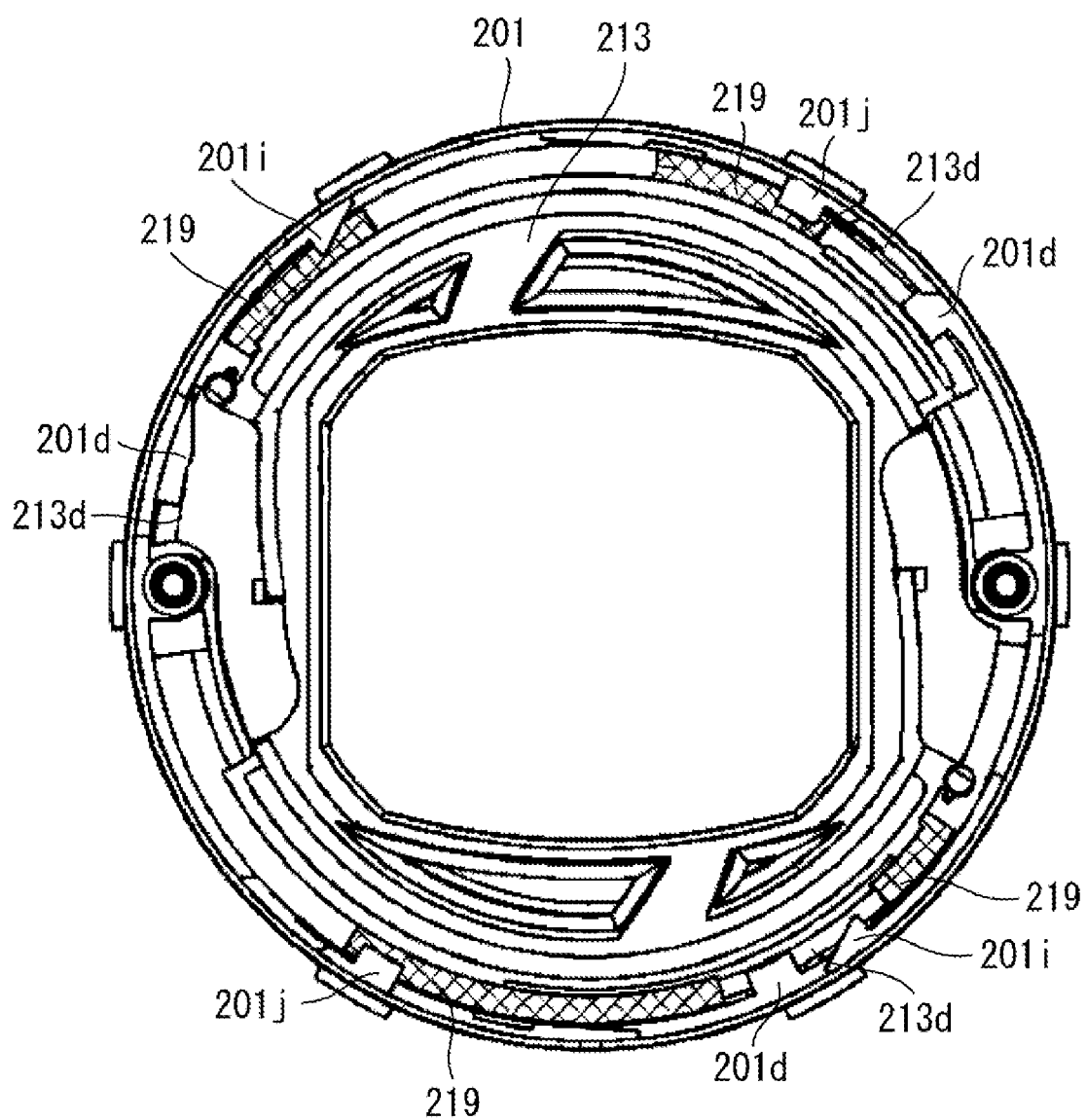
FIG. 16 is a view illustrating a barrier mechanism according to a second embodiment of the present invention, namely, is a front view of the first lens unit barrel with the barrier drive ring incorporated therein, while the barrier blades of the first lens unit barrel are open.
Figure 17:
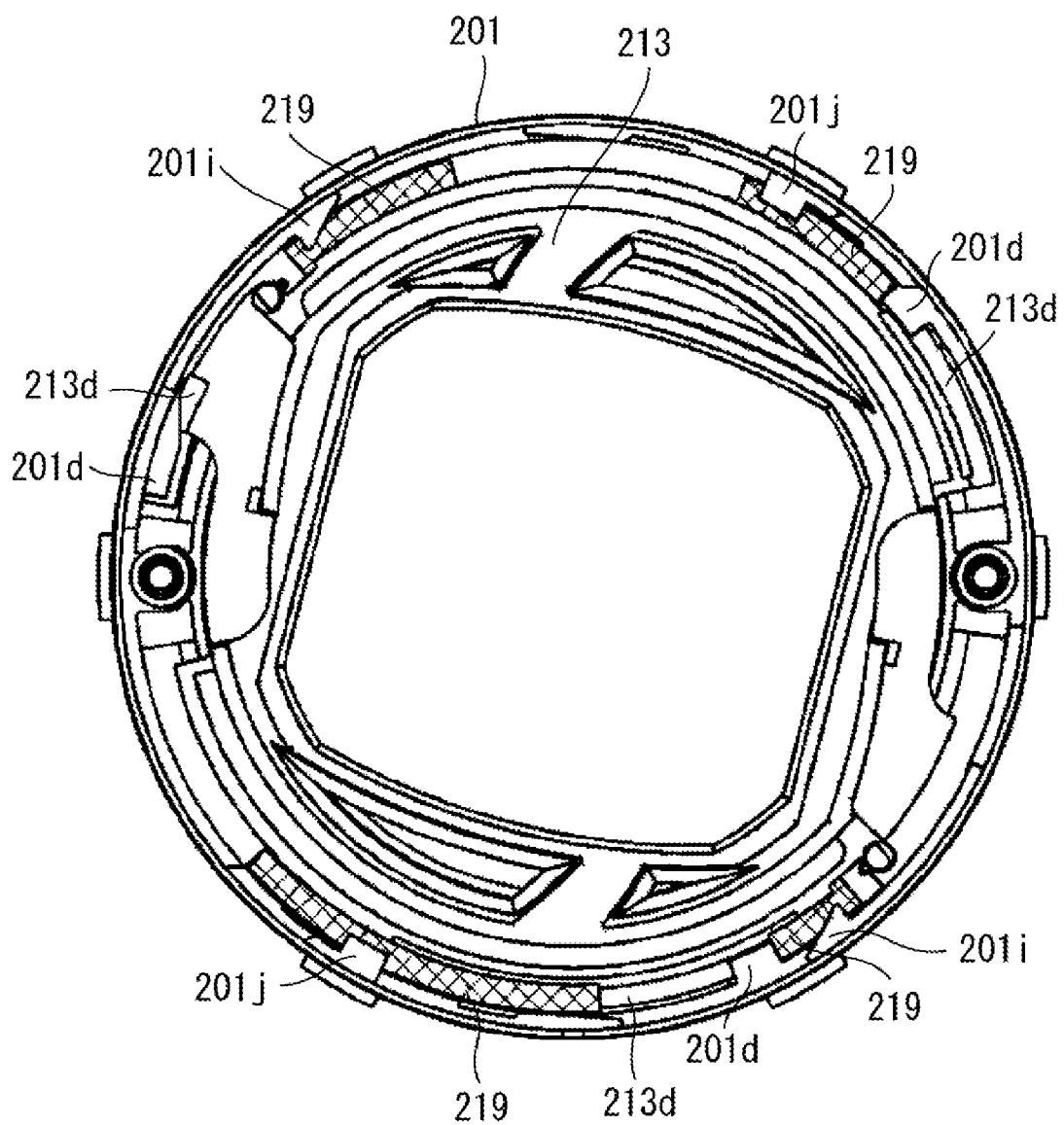
FIG. 17 is a front view of the first lens unit barrel of FIG. 16 with the barrier blades of the first lens unit barrel closed.
Figure 18:
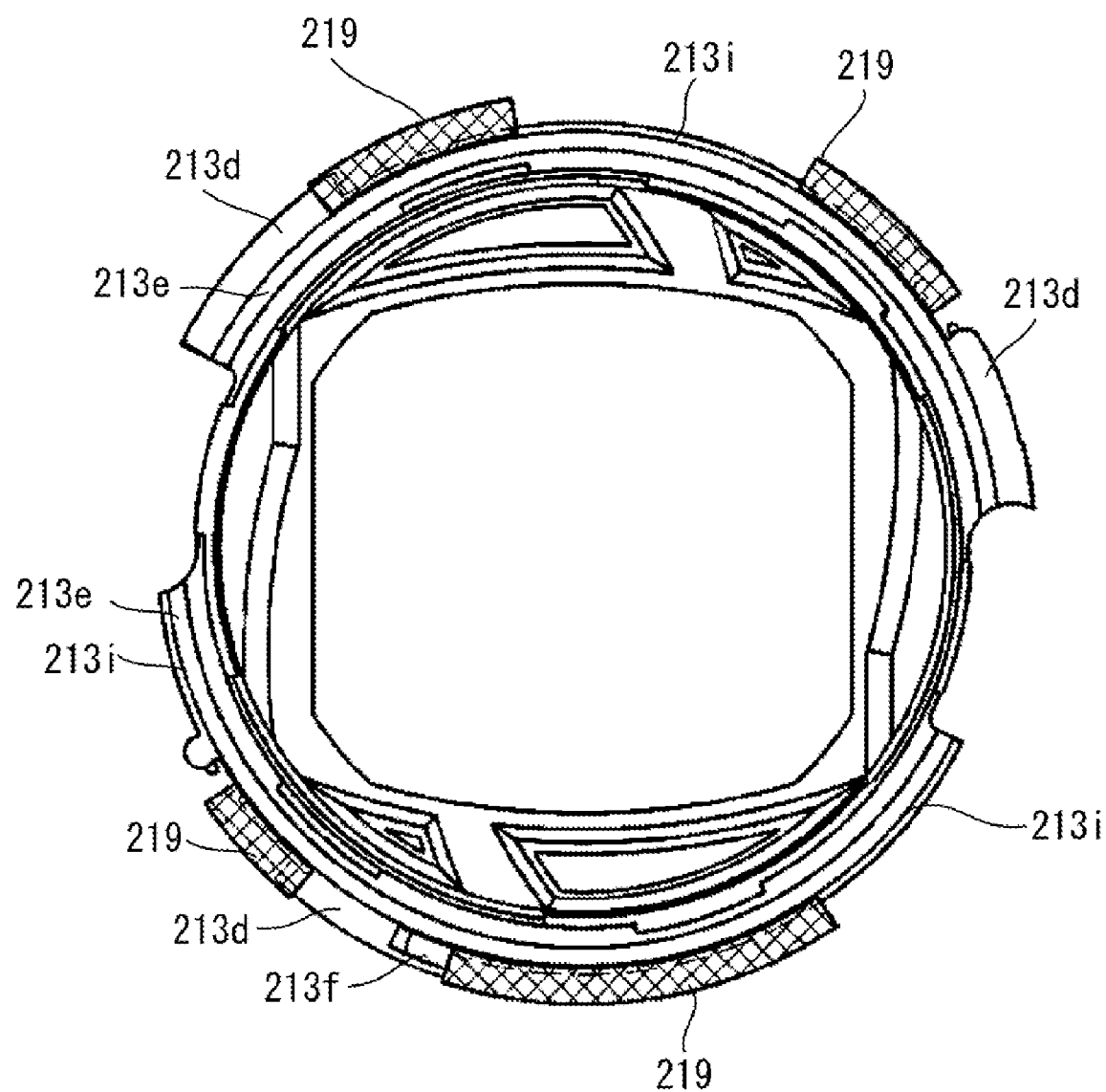
FIG. 18 is a front view illustrating a simple barrier drive ring.
Figure 19:
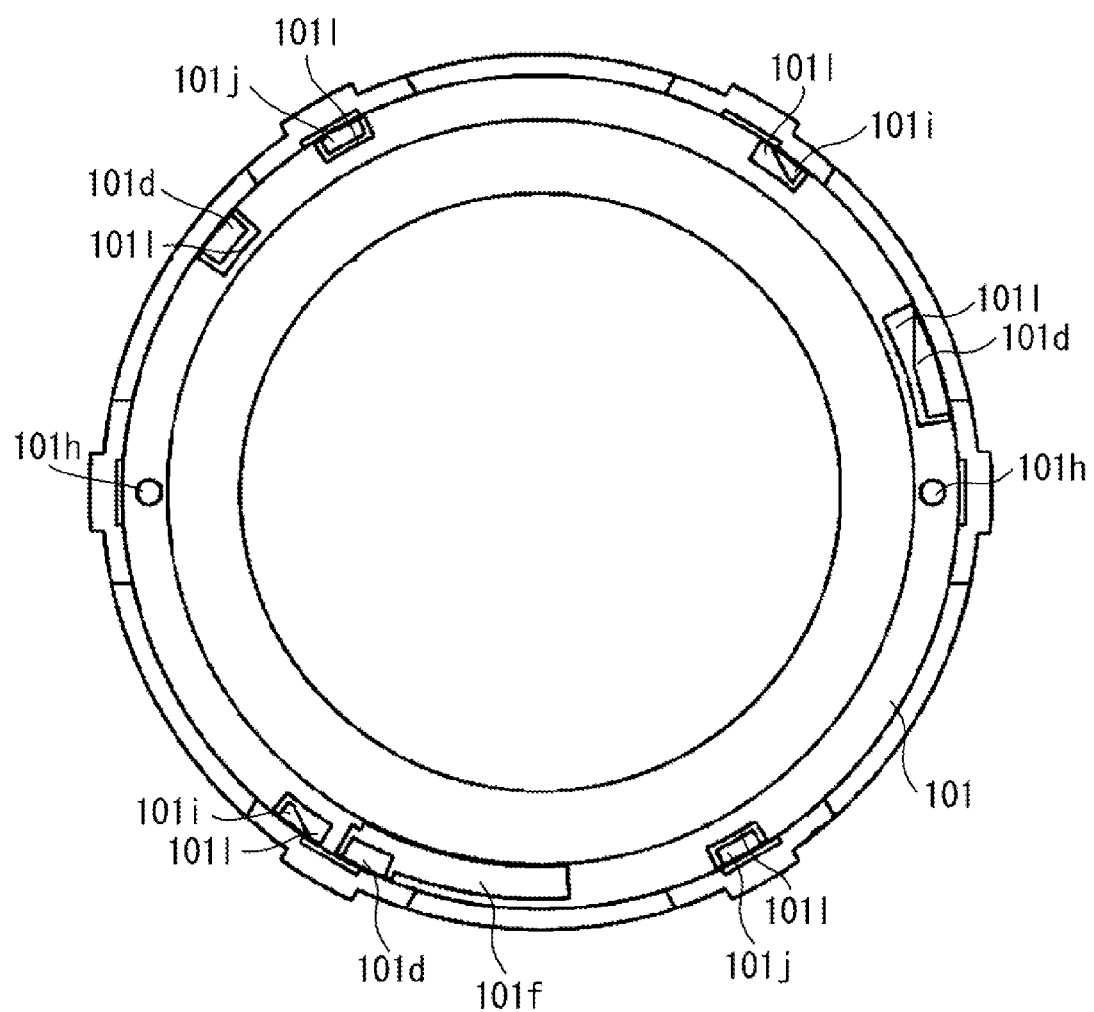
FIG. 19 is a view of a conventional first lens unit barrel having a bayonet structure, namely, is a front view of the conventional first lens unit barrel viewed from an imaging surface side before a barrier drive member is incorporated therein.
Figure 20:
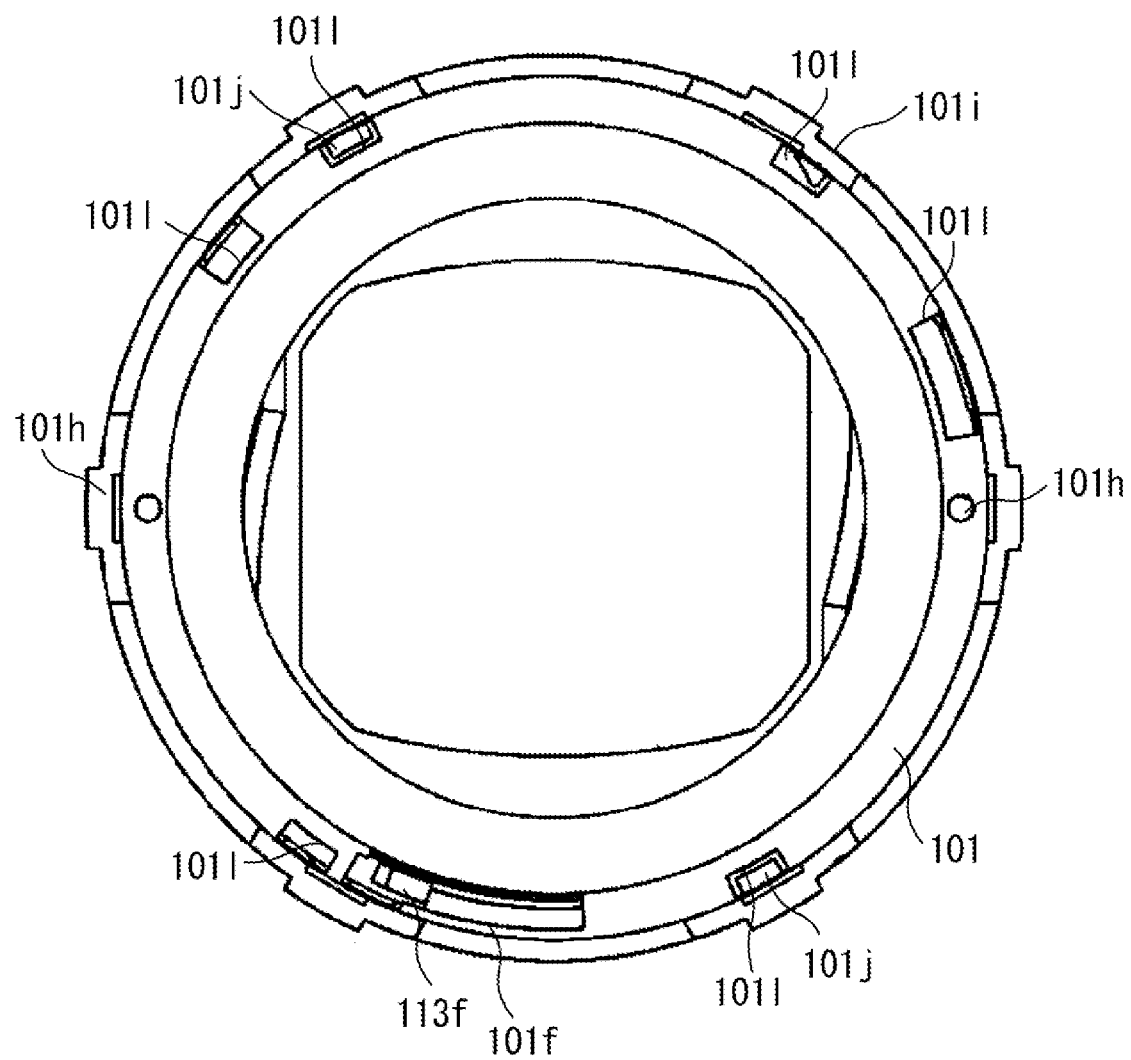
FIG. 20 is a front view of the conventional first lens unit barrel viewed from the imaging surface side, with the barrier drive member incorporated therein.
Figure 21:
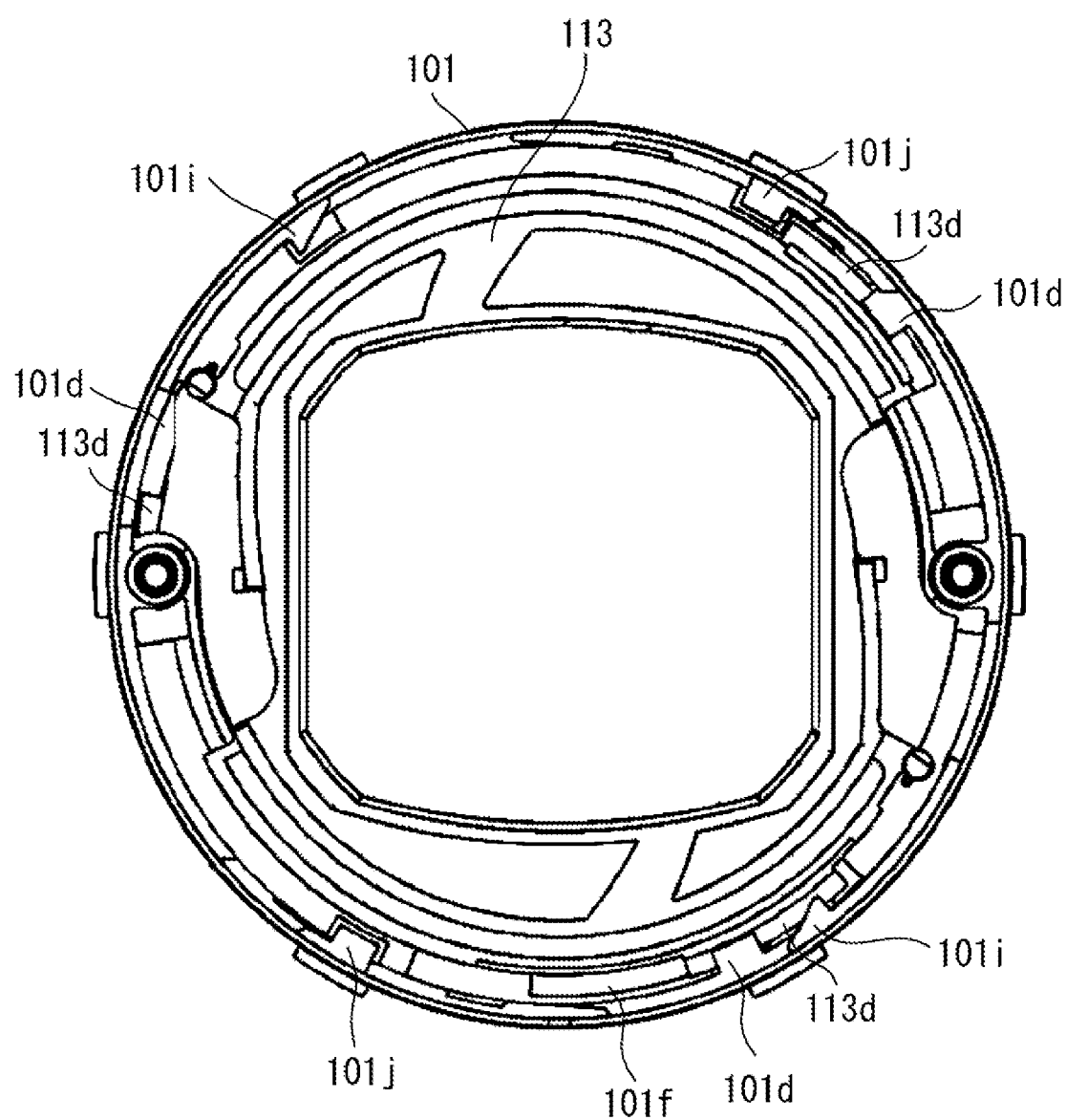
FIG. 21 is a front view of the conventional first lens unit barrel viewed from an object side, with the barrier drive member incorporated therein.
Figure 22:
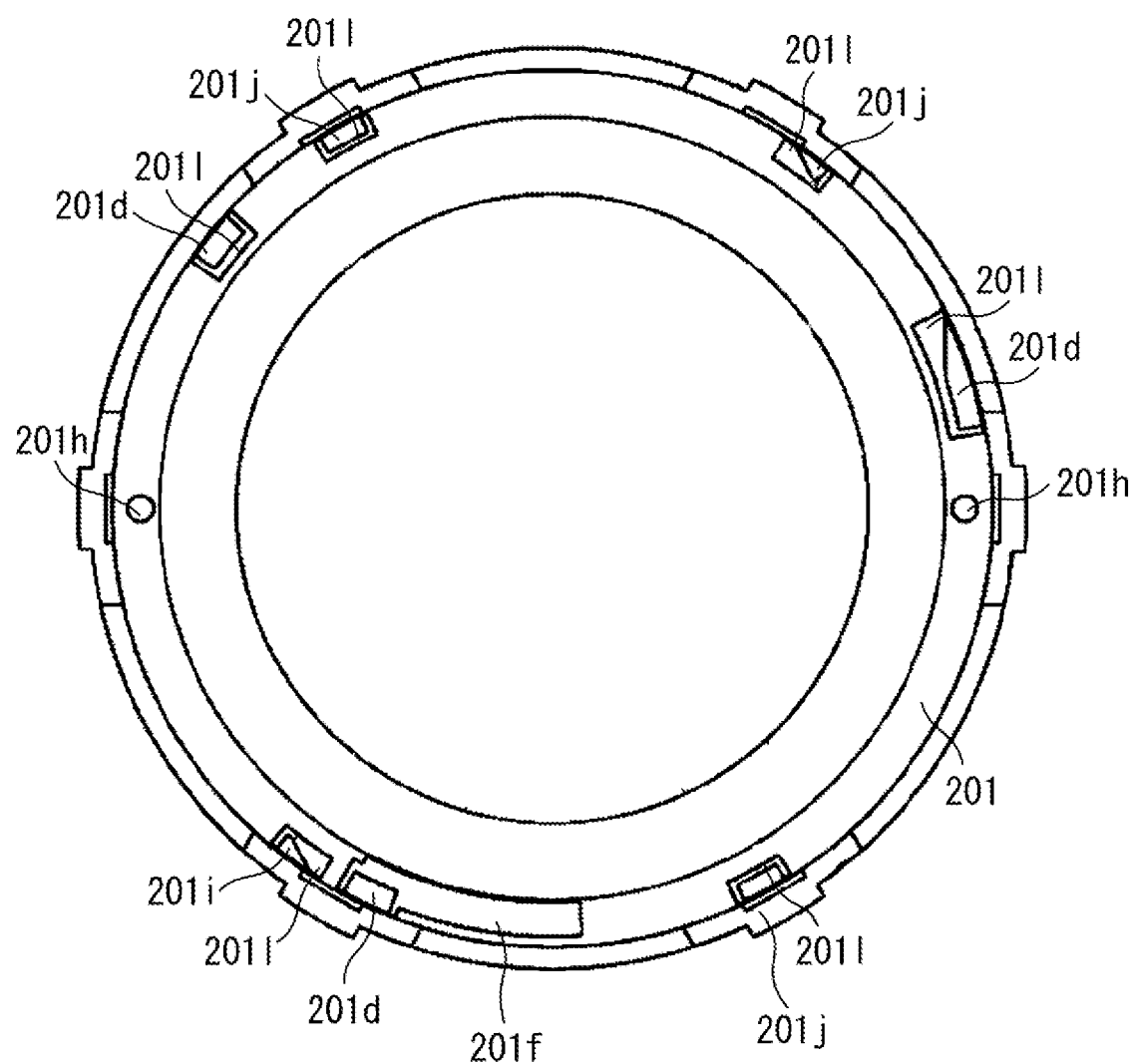
FIG. 22 is a front view of the first lens unit barrel according to the embodiment of the present invention viewed from the imaging surface side before the barrier drive ring is incorporated therein.

FIG. 16 is a front view of the first lens unit barrel in to which the barrier drive ring is incorporated while the barrier blades are open. FIG. 17 is a front view of the first lens unit barrel of FIG. 16 with the barrier blades closed. FIG. 18 is a front view illustrating a single barrier drive ring. FIG. 22 is a front view of the first lens unit barrel before the barrier drive ring is incorporated into the barrel when it is viewed from the imaging surface side. Description and illustration of the portions overlapping with the above first embodiment will be omitted.

In the barrier mechanism of the present embodiment as illustrated in FIGS. 16, 17, and 22, a first lens unit barrel 201 includes bayonet claws 201d, 201i, and 201j. Each of the bayonet claws 201d, 201i, and 201j is provided with a through-hole 2011 for molding the bayonet claws 201d, 201i, and 201j, in the optical axis direction.

Also, a through-hole 201f is provided in the first lens unit barrel 201 in order to allow the interlocking lever 213f to pass through the through-hole 201f. In FIG. 22, since the through-hole 201f is positioned next to a bayonet claws 201d, the through-hole 201f is configured only at this portion to expand in a circumferential direction similar to the other through-holes 201l.

As illustrated in FIG. 18, a barrier drive ring 213 is provided with flange portions 213d and the flange portions 213i, respectively at three positions in the circumferential direction. The three flange portions 213d and one of the flange portions 213i are provided integrally with a sheet-like flexible member 219.

Examples of materials for the flexible member 219 include a sheet made of a polyethylene terephthalate (PET) and a sheet made of a polyester film or the like, or a sheet made of a rubber such as nitrile butadiene rubber (NBR) or the like. Any material may be employed for the flexible member 219 as far as it has a thin, soft, and deformable.

The flexible members 219 are attached to the three flange portions 213d of the barrier drive ring 213 and one of the flange portions 213i at positions corresponding to the through-holes 201f and 201l of the first lens unit barrel 201. The flexible members 219 are attached to the three flange portions 213d so as to enlarge the flange portions 213d in the circumferential direction.

When the flexible members 219 are attached, the flexible members 219 contact the bayonet claws 201d, 201i, and 201j at a side surface of the first lens unit barrel 201 in a built-in phase. However, by deformation of the flexible members 219, its built-in can be easily performed. The attachment of the flexible members 219 to the barrier drive ring 213 may be performed after the barrier drive ring 213 is incorporated into the first lens unit barrel 201.

As described above, since the through-holes 201f and 201l can be covered by the flexible members 219 which are integrally attached to the barrier drive ring 213 according to the present exemplary embodiment, the dust hardly comes into the first lens unit barrel 201. The other configurations and the advantageous results in the present exemplary embodiment are identical to the above-described first embodiment.

In each of the above embodiments, the barrier mechanism used in digital cameras is described as an example; however, the use of the present barrier mechanism is not limited to the digital cameras. The present invention may also be applied to a barrier mechanism used in a silver-halide camera, a video camera, a mobile device with a camera function, other optical devices, and an apparatus including the optical devices.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priorities from Japanese Patent Application Nos. 2007-203033 filed Aug. 3, 2007, 2007-208077 filed Aug. 9, 2007, and 2007-209691 filed Aug. 10, 2007, which are hereby incorporated by reference herein in their entireties.

What is claimed is:

1. A barrier mechanism comprising:
a barrel configured to hold a lens,
wherein the barrel further includes bayonet claws which fit into the flange portions to control a movement of a barrier drive member relative to the barrel in an optical axis direction, and
wherein the bayonet claws are formed by providing lateral holes orthogonal to the optical axis in the barrel;
barrier blades configured to protect the lens held by the barrel;
a barrier drive member configured to rotate to open/close the barrier blades;
wherein the barrel includes a through-hole through which an interlocking lever provided on the barrier drive member passes in order to convey a rotation force of the barrier drive member;
wherein the barrier drive member includes a flange portion in a circumferential direction, and
wherein the flange portion is positioned at the same phase as the interlocking lever and covers the through-hole from an optical axis direction during a rotation of the barrier blades from an open state to a closed state; and
a covering member configured to cover the barrel;
wherein the covering member covers the lateral holes.

2. The barrier mechanism according to claim 1, wherein the flange portion includes a plurality of flange portions provided in the circumferential direction, and wherein one of the plurality of flange portions is positioned at the same phase as the interlocking lever.

3. A barrier mechanism comprising:
a barrel configured to hold a lens;
barrier blades configured to protect the lens held by the barrel; and
a barrier drive member configured to rotate to open/close the barrier blades;
wherein the barrier drive member includes an interlocking lever to which a rotational force is conveyed;
wherein the barrel includes a through-hole through which the interlocking lever passes; and
wherein the barrier drive member includes flange portions to which flexible members for covering at least the through-holes from the optical axis direction are attached, while the barrier drive member rotates following a movement of the barrier blades from an open state to a closed state.

* * * * *